United States Patent
Lee et al.

(10) Patent No.: US 12,164,947 B2
(45) Date of Patent: Dec. 10, 2024

(54) METHOD AND APPARATUS FOR CONTROLLING VIRTUAL MACHINE RELATED TO VEHICLE

(71) Applicant: LG Electronics Inc., Seoul (KR)

(72) Inventors: Chulhee Lee, Seoul (KR); Namyong Park, Seoul (KR); Taesuk Yoon, Seoul (KR); Dongkyu Lee, Seoul (KR); Eunkoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 720 days.

(21) Appl. No.: 16/588,173

(22) Filed: Sep. 30, 2019

(65) Prior Publication Data

US 2020/0026546 A1    Jan. 23, 2020

(30) Foreign Application Priority Data

Sep. 10, 2019   (KR) .................. 10-2019-0112037

(51) Int. Cl.
  *G06F 9/455* (2018.01)
  *G05D 1/00* (2024.01)
  *H04W 4/44* (2018.01)

(52) U.S. Cl.
  CPC ....... *G06F 9/45558* (2013.01); *G05D 1/0088* (2013.01); *G05D 1/0287* (2013.01); *H04W 4/44* (2018.02); *G06F 2009/45562* (2013.01)

(58) Field of Classification Search
  CPC .............. G06D 1/0287; G06D 1/0088; G06D 2201/0213
  See application file for complete search history.

(56) References Cited

U.S. PATENT DOCUMENTS

| | | | | |
|---|---|---|---|---|
| 9,491,112 | B1 * | 11/2016 | Patel | G06F 9/5005 |
| 9,568,995 | B1 | 2/2017 | Lian | |
| 9,864,636 | B1 * | 1/2018 | Patel | G06F 9/5061 |
| 10,397,303 | B1 * | 8/2019 | Kuo | H04L 67/125 |

(Continued)

FOREIGN PATENT DOCUMENTS

| | | |
|---|---|---|
| KR | 10-2016-0132789 | 11/2016 |
| KR | 10-2018-0039011 | 4/2018 |
| KR | 10-2019-0053993 | 5/2019 |

OTHER PUBLICATIONS

Office Action in Korean Appln. No. 10-2019-0112037, mailed on Apr. 22, 2024, 12 pages (with English translation).

*Primary Examiner* — Douglas B Blair
(74) *Attorney, Agent, or Firm* — Fish & Richardson P.C.

(57) ABSTRACT

One or more of an autonomous vehicle, a user terminal, and a server of the present disclosure may be linked or converged with an artificial intelligence (AI) module, an unmanned aerial vehicle (UAV), a robot, an augmented reality (AR) device, virtual reality (VR), a 5G service-related device, and the like. There is provided a method for providing information in a server according to an embodiment of the present disclosure includes receiving a request message including information related to generation of a virtual machine (VM) from an operating apparatus, generating a VM corresponding to the operating apparatus based on the request message, receiving information acquired at the operating apparatus, performing computation corresponding to the acquired information by use of the VM, and transmitting information related to a result of the computation to the operating apparatus.

16 Claims, 19 Drawing Sheets

(56) References Cited

U.S. PATENT DOCUMENTS

| | | | | |
|---|---|---|---|---|
| 10,459,444 | B1* | 10/2019 | Kentley-Klay | G05D 1/0027 |
| 10,922,113 | B2* | 2/2021 | Bartsch | H04L 67/01 |
| 11,126,474 | B1* | 9/2021 | Zidenberg | G06F 9/5016 |
| 11,228,516 | B1* | 1/2022 | Harwani | H04L 45/121 |
| 2005/0060704 | A1* | 3/2005 | Bulson | G06F 9/5077 |
| | | | | 718/1 |
| 2014/0046585 | A1* | 2/2014 | Morris, IV | G06Q 10/047 |
| | | | | 701/400 |
| 2014/0250436 | A1* | 9/2014 | Tang | G06F 9/466 |
| | | | | 718/1 |
| 2016/0127850 | A1* | 5/2016 | Kao | H04W 4/70 |
| | | | | 370/328 |
| 2017/0269908 | A1* | 9/2017 | Tonshal | G06F 9/544 |
| 2017/0322869 | A1 | 11/2017 | Hotra et al. | |
| 2018/0063261 | A1* | 3/2018 | Moghe | G08G 1/123 |
| 2018/0302476 | A1* | 10/2018 | Perez | H04L 67/125 |
| 2018/0341768 | A1* | 11/2018 | Marshall | G06F 21/53 |
| 2019/0029002 | A1* | 1/2019 | Kotzer | H04L 67/12 |
| 2019/0053296 | A1* | 2/2019 | Balappanavar | H04B 7/0617 |
| 2019/0228648 | A1* | 7/2019 | Moustafa | G01C 21/3896 |
| 2019/0261370 | A1* | 8/2019 | Amini | H04L 1/0003 |
| 2019/0306242 | A1* | 10/2019 | Thummalapalli | H04L 41/0806 |
| 2019/0316919 | A1* | 10/2019 | Keshavamurthy | |
| | | | | G08G 1/096844 |
| 2019/0394061 | A1* | 12/2019 | Chen | H04L 12/283 |
| 2020/0035099 | A1* | 1/2020 | Sivakumar | G08G 1/056 |
| 2020/0067876 | A1* | 2/2020 | Sireling | H04L 61/5038 |
| 2020/0104184 | A1* | 4/2020 | Subramanian | G06N 3/04 |
| 2020/0159648 | A1* | 5/2020 | Ghare | G06F 9/4411 |
| 2020/0296734 | A1* | 9/2020 | Chae | H04W 72/541 |
| 2020/0296789 | A1* | 9/2020 | Wang | H04W 64/006 |
| 2020/0327024 | A1* | 10/2020 | Alkalay | G06F 3/064 |
| 2020/0366737 | A1* | 11/2020 | Florit | H04L 41/145 |
| 2021/0027538 | A1* | 1/2021 | Bleyer | H04L 67/52 |

* cited by examiner

METHOD AND APPARATUS FOR CONTROLLING VIRTUAL MACHINE RELATED TO VEHICLE

CROSS-REFERENCE TO RELATED APPLICATION

This application claims the benefit of Korean Patent Application No. 10-2019-0112037, filed on Sep. 10, 2019, in the Korean Intellectual Property Office, the disclosure of which is incorporated herein in its entirety by reference.

BACKGROUND

1. Field

The present disclosure relates to a method and an apparatus for generating a virtual machine (VM) in a server and controlling the VM, the VM which corresponds to an operating apparatus related to a vehicle. Particularly, the present disclosure relates to a method and an apparatus for generating a VM corresponding in a server based on performance and an execution environment of an operating apparatus related to a vehicle and for supporting an operation of the operating apparatus of the vehicle based on the VM.

2. Description of the Related Art

With development of technologies, an increasing number of electronic devices are installed in a vehicle. An operating apparatus is included in the vehicle to process and control information received from the vehicle, and an additional application may be installed and executed. The vehicle is generally used for a long period of time compared to the operating apparatus. In addition, an operating system (OS) differs depending on a manufacturer of the vehicle and thus a software optimization method may differ depending on the operating system. For this reason, it is necessary to support system maintenance and administration and verify execution of an application in each operating apparatus.

Accordingly, when a function relating to autonomous driving which increases computation required for the operating apparatus is performed or when resources in the operating apparatus are used by multiple passengers, resources more than resources supported by the operating apparatus are required. It is necessary to anticipate such a case and provide a support to handle with the case.

SUMMARY

An aspect provides a method and an apparatus, whereby a virtual machine (VM) corresponding to an operating apparatus related to a vehicle is provided in a server and the VM predicts a resource usage according to an execution environment of the operating apparatus and controls execution of the computation device based on information on the estimated resource usage.

Another aspect provides a method and an apparatus whereby a VM corresponding to an operating apparatus is generated and the VM receives execution environment information from the operating apparatus and supports an operation of the operating apparatus which corresponds to a vehicle.

Yet another aspect provides a method and an apparatus, whereby a VM corresponding to an operating apparatus verifies, based on resources of the operating apparatus, whether a specific application is executable and provide relevant control information to the operating apparatus.

According to an aspect, there is provided a method for providing information in a server, the method including: receiving a request message including information related to generation of a virtual machine (VM) from an operating apparatus; generating a VM corresponding to the operating apparatus based on the request message; receiving information acquired at the operating apparatus; performing computation corresponding to the acquired information by use of the VM; and transmitting information related to a result of the computation to the operating apparatus.

According to another aspect, there is provided a server for providing information, the server including: a transceiver; and a controller configured to control the transceiver, to receive a request message including information related to generation of virtual machine (VM), to generate a VM corresponding to the operating apparatus based on the request message, to receive information acquired at the operating apparatus, to perform computation corresponding to the acquired information by use of the VM, and to transmit information related to a result of the computation to the operating apparatus.

According to yet another aspect, there is provided a method for controlling an operating apparatus, the method including: transmitting a request message including information related to generation of a virtual machine (VM) to a server; transmitting acquired information to the server; and receiving, from the server, information related to a result of computation that is performed using the VM, wherein a VM corresponding to the operating apparatus is generated based the request message, and computation corresponding to the acquired information is performed on the VM.

According to an embodiment of the present disclosure, as a VM corresponding to a resource of an operating apparatus of a vehicle is generated to support an operation of the operating apparatus, reliability of the operation of the operating apparatus may be ensured. According to an embodiment of the present disclosure, an operation of the operating apparatus may be estimated using the generated VM, a resource usage may be monitored to predict a situation where a support is needed so that an operation of the operating apparatus is supported accordingly, and therefore, a higher quality service may be provided. According to an embodiment of the present disclosure, an operation of the operating apparatus of the vehicle may be verified in advance using a VM, thereby preventing a malfunction of the operating apparatus.

DETAILED DESCRIPTION

Figure 1:
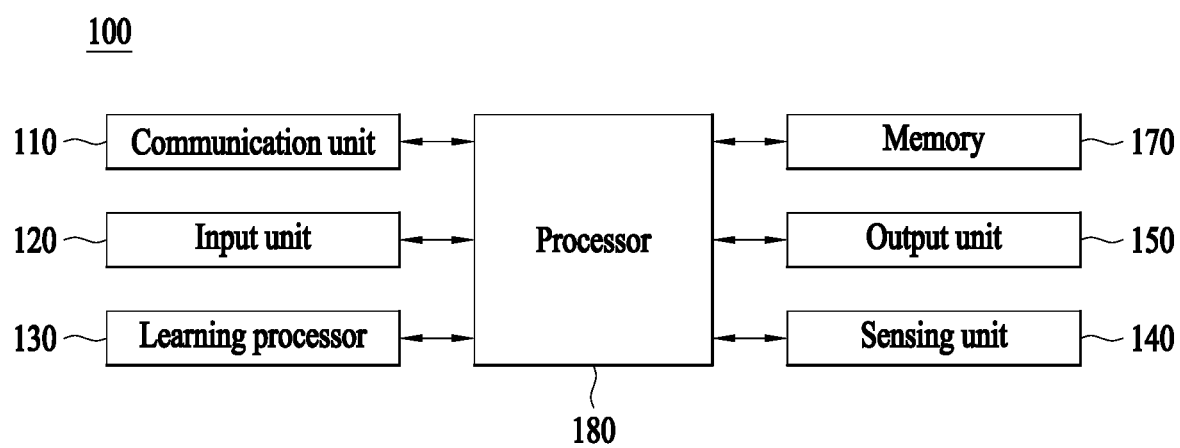
FIG. 1 shows an artificial intelligence (AI) device according to an embodiment of the present disclosure.

Embodiments of the disclosure will be described hereinbelow with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

Exemplary embodiments of the present invention are described in detail with reference to the accompanying drawings.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

In addition, a controller mentioned in the embodiments may include at least one processor that is operated to control a corresponding apparatus. An operation of a constituent element described as a vehicle may be performed by an operating apparatus related to the vehicle.

Artificial Intelligence refers to the field of studying artificial intelligence or a methodology capable of making the artificial intelligence. Machine learning refers to the field of studying methodologies that define and solve various problems handled in the field of artificial intelligence. Machine learning is also defined as an algorithm that enhances the performance of a task through a steady experience with respect to the task.

An artificial neural network (ANN) is a model used in machine learning, and may refer to a general model that is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output input signals that are input through the synapse, weights, and the value of an activation function concerning deflection.

Model parameters refer to parameters determined by learning, and include weights for synaptic connection and deflection of neurons, for example. Then, hyper-parameters mean parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function maybe used as an index for determining an optimal model parameter in a learning process of the artificial neural network.

Machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by an artificial neural network when learning data is input to the artificial neural network. The unsupervised learning may refer to a learning method for an artificial neural network in the state in which no label for learning data is given. The reinforcement learning may mean a learning method in which an agent defined in a certain environment learns to select a behavior or a behavior sequence that maximizes cumulative compensation in each state.

Machine learning realized by a deep neural network (DNN) including multiple hidden layers among artificial neural networks is also called deep learning, and deep learning is a part of machine learning. Hereinafter, machine learning is used as a meaning including deep learning.

The term "autonomous driving" refers to a technology of autonomous driving, and the term "autonomous vehicle" refers to a vehicle that travels without a user's operation or with a user's minimum operation.

For example, autonomous driving may include all of a technology of maintaining the lane in which a vehicle is driving, a technology of automatically adjusting a vehicle speed such as adaptive cruise control, a technology of causing a vehicle to automatically drive along a given route, and a technology of automatically setting a route, along which a vehicle drives, when a destination is set.

A vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

At this time, an autonomous vehicle may be seen as a robot having an autonomous driving function.

FIG. 1 illustrates an AI device 100 according to an embodiment of the present disclosure.

AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle. The AI device may include an operating apparatus related to at least one of a vehicle or a server.

Referring to FIG. 1, Terminal 100 may include a transceiver 110, an input unit 120, a learning processor 130, a sensing unit 140, an output unit 150, a memory 170, and a processor 180, for example.

Transceiver 110 may transmit and receive data to and from external devices, such as other AI devices 100a to 100e and an AI server 200, using wired/wireless communication technologies. For example, transceiver 110 may transmit and receive sensor information, user input, learning models, and control signals, for example, to and from external devices.

In this case, the communication technology used by transceiver 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 120 may acquire various types of data.

In this case, input unit 120 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 120 may acquire, for example, input data to be used when acquiring an output using learning data for model learning and a learning model. Input unit 120 may acquire unprocessed input data, and in this case, processor 180 or learning processor 130 may extract an input feature as pre-processing for the input data.

Learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

In this case, learning processor 130 may perform AI processing along with a learning processor 240 of AI server 200.

In this case, learning processor 130 may include a memory integrated or embodied in AI device 100. Alternatively, learning processor 130 may be realized using memory 170, an external memory directly coupled to AI device 100, or a memory held in an external device. The AI device 100 may be related to the vehicle and may perform an operation required for resource management of the vehicle.

Sensing unit 140 may acquire at least one of internal information of AI device 100 and surrounding environmental information and user information of AI device 100 using various sensors.

In this case, the sensors included in sensing unit 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar, for example.

Output unit 150 may generate, for example, a visual output, an auditory output, or a tactile output.

In this case, output unit 150 may include, for example, a display that outputs visual information, a speaker that outputs auditory information, and a haptic module that outputs tactile information.

Memory 170 may store data which assists various functions of AI device 100. For example, memory 170 may store input data acquired by input unit 120, learning data, learning models, and learning history, for example.

Processor 180 may determine at least one executable operation of AI device 100 based on information determined or generated using a data analysis algorithm or a machine learning algorithm. Then, processor 180 may control constituent elements of AI device 100 to perform the determined operation.

To this end, processor 180 may request, search, receive, or utilize data of learning processor 130 or memory 170, and may control the constituent elements of AI device 100 so as to execute a predictable operation or an operation that is deemed desirable among the at least one executable operation.

In this case, when connection of an external device is necessary to perform the determined operation, processor 180 may generate a control signal for controlling the external device and may transmit the generated control signal to the external device.

Processor 180 may acquire intention information with respect to user input and may determine a user request based on the acquired intention information.

In this case, processor 180 may acquire intention information corresponding to the user input using at least one of a speech to text (STT) engine for converting voice input into a character string and a natural language processing (NLP) engine for acquiring natural language intention information.

In this case, at least a part of the STT engine and/or the NLP engine may be configured with an artificial neural network learned according to a machine learning algorithm. Then, the STT engine and/or the NLP engine may have learned by learning processor 130, may have learned by learning processor 240 of AI server 200, or may have learned by distributed processing of processors 130 and 240.

Processor 180 may collect history information including, for example, the content of an operation of AI device 100 or feedback of the user with respect to an operation, and may store the collected information in memory 170 or learning processor 130, or may transmit the collected information to an external device such as AI server 200. The collected history information may be used to update a learning model.

Processor 180 may control at least some of the constituent elements of AI device 100 in order to drive an application program stored in memory 170. Moreover, processor 180 may combine and operate two or more of the constituent elements of AI device 100 for the driving of the application program.

Figure 2:
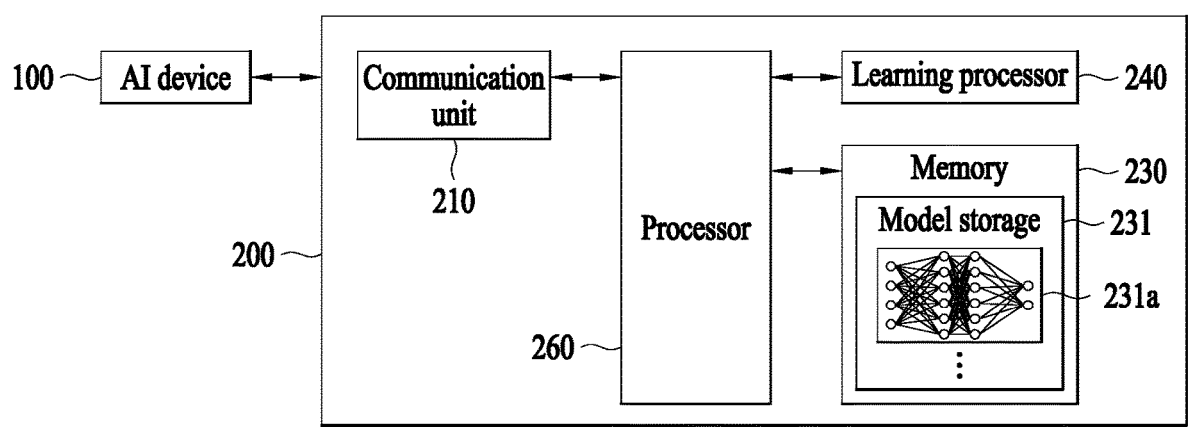
FIG. 2 shows an AI server according to an embodiment of the present disclosure.

FIG. 2 illustrates AI server 200 according to an embodiment of the present disclosure.

Referring to FIG. 2, AI server 200 may refer to a device that causes an artificial neural network to learn using a machine learning algorithm or uses the learned artificial neural network. Here, AI server 200 may be constituted of multiple servers to perform distributed processing, and may be defined as a 5G network. In this case, AI server 200 may be included as a constituent element of AI device 100 so as to perform at least a part of AI processing together with AI device 100.

AI server 200 may include a transceiver 210, a memory 230, a learning processor 240, and a processor 260, for example.

Transceiver 210 may transmit and receive data to and from an external device such as AI device 100.

Memory 230 may include a model storage unit 231. Model storage unit 231 may store a model (or an artificial neural network) 231a which is learning or has learned via learning processor 240.

Learning processor 240 may cause artificial neural network 231a to learn learning data. A learning model may be used in the state of being mounted in AI server 200 of the artificial neural network, or may be used in the state of being mounted in an external device such as AI device 100.

The learning model may be realized in hardware, software, or a combination of hardware and software. In the case in which a part or the entirety of the learning model is realized in software, one or more instructions constituting the learning model may be stored in memory 230.

Processor 260 may deduce a result value for newly input data using the learning model, and may generate a response or a control instruction based on the deduced result value.

The AI server may include a server that generates a VM related to the vehicle and drives the VM. The server may perform learning based on data on generation and driving of the VM, and perform an operation to optimize such learning process.

Figure 3:
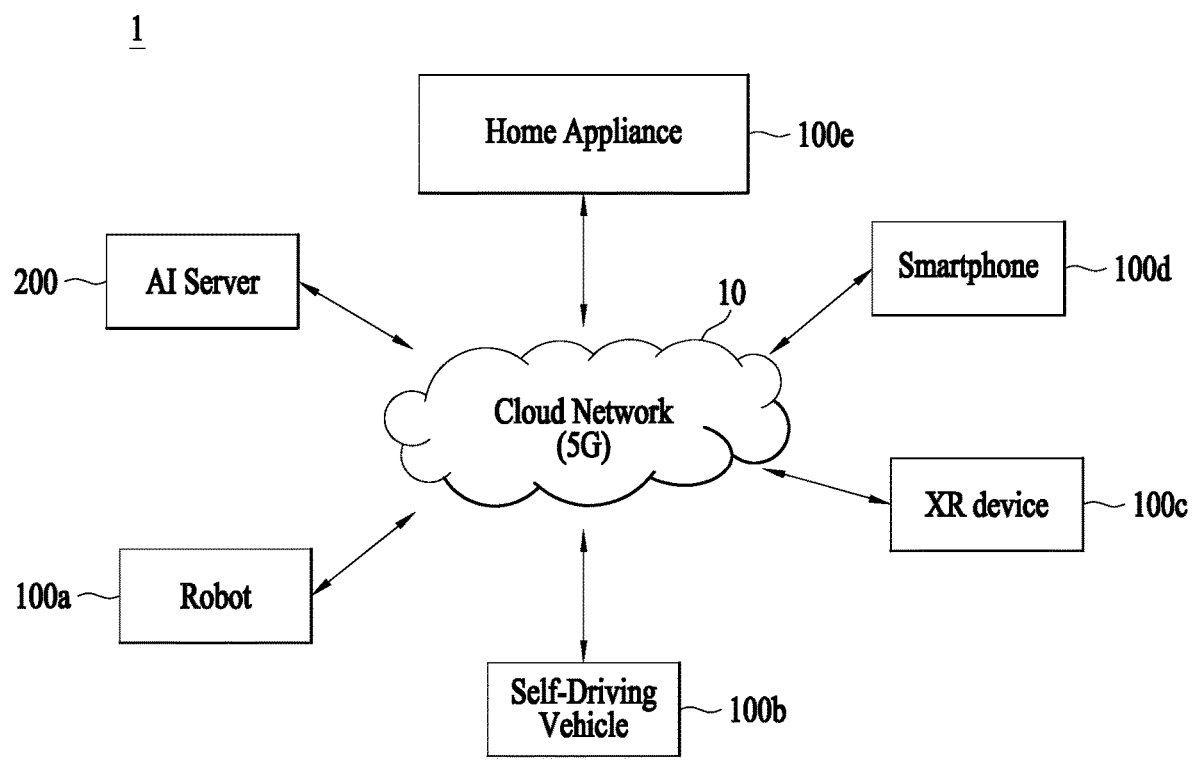
FIG. 3 shows an AI system according to an embodiment of the present disclosure.

FIG. 3 illustrates an AI system 1 according to an embodiment of the present disclosure.

Referring to FIG. 3, in AI system 1, at least one of AI server 200, a robot 100a, an autonomous driving vehicle 100b, an XR device 100c, a smart phone 100d, and a home appliance 100e is connected to a cloud network 10. Here, robot 100a, autonomous driving vehicle 100b, XR device 100c, smart phone 100d, and home appliance 100e, to which AI technologies are applied, may be referred to as AI devices 100a to 100e.

Cloud network 10 may constitute a part of a cloud computing infra-structure, or may mean a network present in the cloud computing infra-structure. Here, cloud network 10 may be configured using a 3G network, a 4G or long term evolution (LTE) network, or a 5G network, for example.

That is, respective devices 100a to 100e and 200 constituting AI system 1 may be connected to each other via cloud network 10. In particular, respective devices 100a to 100e and 200 may communicate with each other via a base station, or may perform direct communication without the base station.

AI server 200 may include a server which performs AI processing and a server which performs an operation with respect to big data.

AI server 200 may be connected to at least one of robot 100a, autonomous driving vehicle 100b, XR device 100c, smart phone 100d, and home appliance 100e, which are AI devices constituting AI system 1, via cloud network 10, and may assist at least a part of AI processing of connected AI devices 100a to 100e.

In this case, instead of AI devices 100a to 100e, AI server 200 may cause an artificial neural network to learn according to a machine learning algorithm, and may directly store a learning model or may transmit the learning model to AI devices 100a to 100e.

In this case, AI server 200 may receive input data from AI devices 100a to 100e, may deduce a result value for the received input data using the learning model, and may generate a response or a control instruction based on the deduced result value to transmit the response or the control instruction to AI devices 100a to 100e.

Alternatively, AI devices 100a to 100e may directly deduce a result value with respect to input data using the learning model, and may generate a response or a control instruction based on the deduced result value.

Hereinafter, various embodiments of AI devices 100a to 100e, to which the above-described technology is applied, will be described. Here, AI devices 100a to 100e illustrated in FIG. 3 may be specific embodiments of AI device 100 illustrated in FIG. 1.

Autonomous driving vehicle 100b may be realized into a mobile robot, a vehicle, or an unmanned air vehicle, for example, through the application of AI technologies.

Autonomous driving vehicle 100b may include an autonomous driving control module for controlling an autonomous driving function, and the autonomous driving control module may mean a software module or a chip realized in hardware. The autonomous driving control module may be a constituent element included in autonomous driving vehicle 100b, but may be a separate hardware element outside autonomous driving vehicle 100b so as to be connected to autonomous driving vehicle 100b.

Autonomous driving vehicle 100b may acquire information on the state of autonomous driving vehicle 100b using sensor information acquired from various types of sensors, may detect (recognize) the surrounding environment and an object, may generate map data, may determine a movement route and a driving plan, or may determine an operation.

Here, autonomous driving vehicle 100b may use sensor information acquired from at least one sensor among a lidar, a radar, and a camera in the same manner as robot 100a in order to determine a movement route and a driving plan.

In particular, autonomous driving vehicle 100b may recognize the environment or an object with respect to an area outside the field of vision or an area located at a predetermined distance or more by receiving sensor information from external devices, or may directly receive recognized information from external devices.

Autonomous driving vehicle 100b may perform the above-described operations using a learning model configured with at least one artificial neural network. For example, autonomous driving vehicle 100b may recognize the surrounding environment and the object using the learning model, and may determine a driving line using the recognized surrounding environment information or object information. Here, the learning model may be directly learned in autonomous driving vehicle 100b, or may be learned in an external device such as AI server 200.

In this case, autonomous driving vehicle 100b may generate a result using the learning model to perform an operation, but may transmit sensor information to an external device such as AI server 200 and receive a result generated by the external device to perform an operation.

Autonomous driving vehicle 100b may determine a movement route and a driving plan using at least one of map data, object information detected from sensor information, and object information acquired from an external device, and a drive unit may be controlled to drive autonomous driving vehicle 100*b* according to the determined movement route and driving plan.

The map data may include object identification information for various objects arranged in a space (e.g., a road) along which autonomous driving vehicle 100*b* drives. For example, the map data may include object identification information for stationary objects, such as streetlights, rocks, and buildings, and movable objects such as vehicles and pedestrians. Then, the object identification information may include names, types, distances, and locations, for example.

In addition, autonomous driving vehicle 100*b* may perform an operation or may drive by controlling the drive unit based on user control or interaction. In this case, autonomous driving vehicle 100*b* may acquire interactional intention information depending on a user operation or voice expression, and may determine a response based on the acquired intention information to perform an operation.

Figure 4:
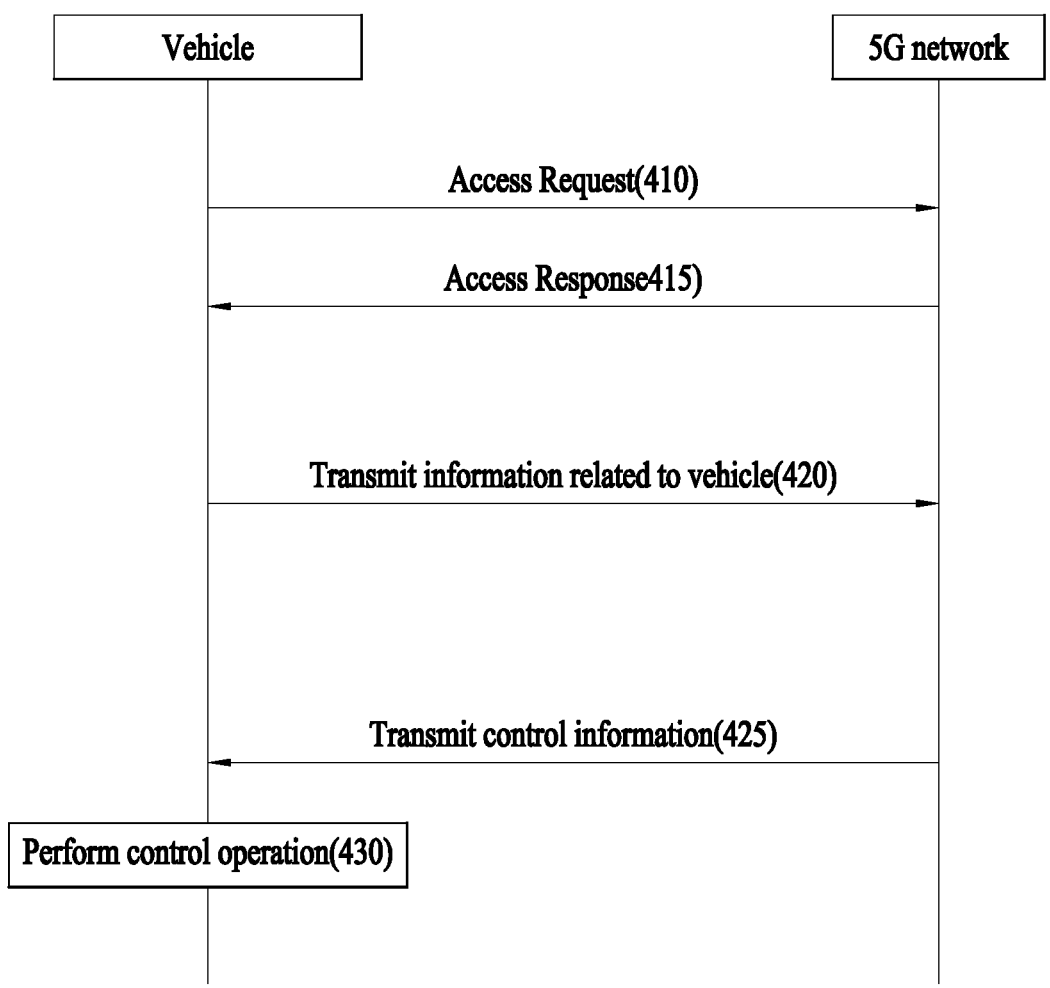
FIG. 4 is a diagram for explaining a control operation of a vehicle through transmission and reception of information between the vehicle and a 5G network according to an embodiment of the present disclosure.

FIG. 4 is a diagram for explaining a control operation of a vehicle in accordance with transmission and reception of information between the vehicle and a 5G network according to an embodiment of the present disclosure.

Referring to FIG. 4, there is illustrated a method for communication between the vehicle and the 5G network.

In step 410, the vehicle may transmit an access request to the 5G network. The access request may be received by a base station, and the access request may be transmitted on a channel for transmitting the access request. The access request may include information necessary to identify the vehicle.

In step 415, the 5G network may transmit a response to the access request to the vehicle. The response to the access request may include identification information that the vehicle uses when receiving information later on. In addition, the response to the access request may include radio resource allocation information necessary for information transmission and reception of the vehicle.

In step 420, the vehicle may transmit information related to the vehicle based on the received information. The information related to the vehicle may include information acquired by a sensor provided in the vehicle or information related to an application used in the vehicle.

In step 425, the 5G network may transmit control information to the vehicle. The control information may include information that is generated by the server based on information acquired from the vehicle.

In step 430, the vehicle may perform a control operation thereof based on the received information. The control operation may include performing a driving-related operation based on received control information. In addition, the control operation may include controlling an operation of an application based on received information. In addition, the control information may include information necessary to support driving of the vehicle.

The information transmitted in the steps 420 and 425 may be transmitted on the same channel, and the corresponding channel may be a channel for a sidelink or a channel for high-speed and low-latency communication. In another embodiment, the information transmitted in the step 420 may be transmitted on a shared channel for uplink data transmission, and the information transmitted in the step 425 may be transmitted on a channel for high-speed and low-latency communication. In addition, the vehicle may receive information from the 5G network based on information required to identify the vehicle assigned by the 5G network.

Figure 5:
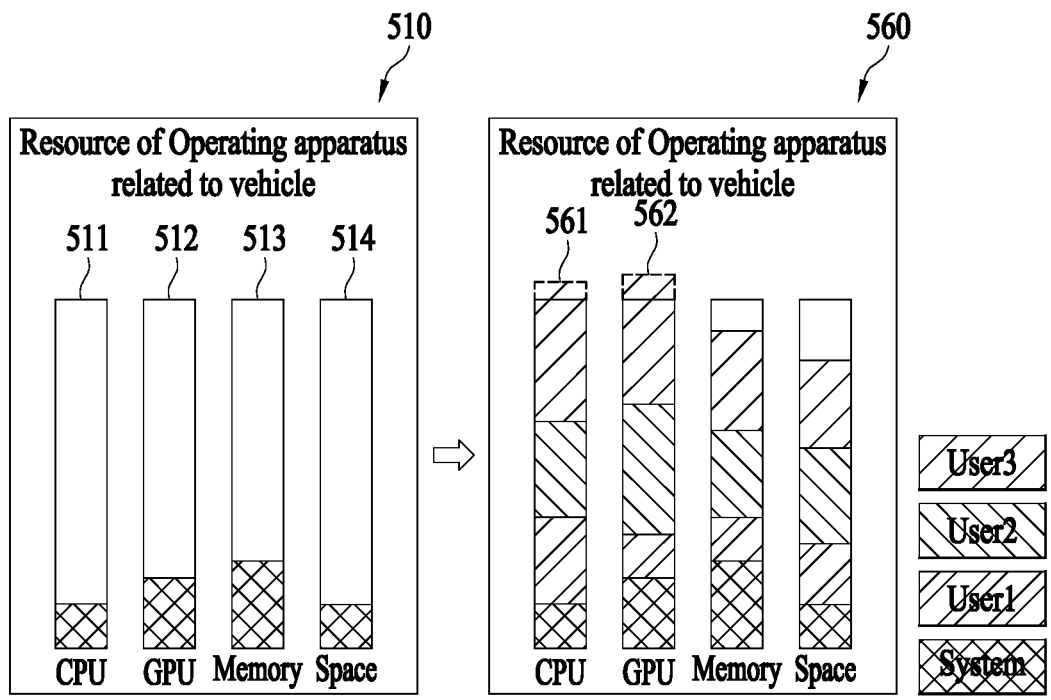
FIG. 5 is a diagram for explaining a resource usage in an operating apparatus related to a vehicle according to an embodiment of the present disclosure.

FIG. 5 is a diagram for explaining a resource usage in an operating apparatus related to a vehicle according to an embodiment of the present disclosure.

Referring to FIG. 5, reference numeral 510 indicates a utilization rate of resources in the operating apparatus when only resources used by a system of the vehicle are used.

A CPU 511, a GPU 512, a memory 513, and a storage space 514 are illustrate as resources of the operating apparatus in the vehicle, but aspects of the present disclosure are not limited thereto. The resources may be utilized by computation performed in the vehicle, and a usage of each resource is illustrated in the drawings.

The CPU 511 may perform overall operations related to the operating apparatus. The GPU 512 may perform image-related computation and may perform the corresponding computation by a control of another element. The memory 513 may include a main memory which is enabled to read and write using a random access memory. The storage space 514 may include a storage space in which an application can be installed and in which data can be stored.

Reference numeral 560 indicates a utilization rate of resources when User 1, User 2, and User 3. In this case, resources exceeding a corresponding resource capability may be needed, as indicated by reference numerals 561 and 562 regarding the CPU and the GPU. In a real word, if computation which requires resources exceeding resources of the operating apparatus is requested, operation of the operating apparatus may be slow down or an error may occur. Given such cases, it is necessary to predict resources to be used by all users and to control resources to be used by each of the users.

To this end, a virtual machine corresponding to the operating apparatus of the vehicle may be generated in the server, and an operation of the operating apparatus of the vehicle is performed in the VM to thereby monitor resource usage. In addition, the VM may predict an operation of the operating apparatus of the vehicle and, when necessary, support the operation of the operating apparatus.

Figure 6:
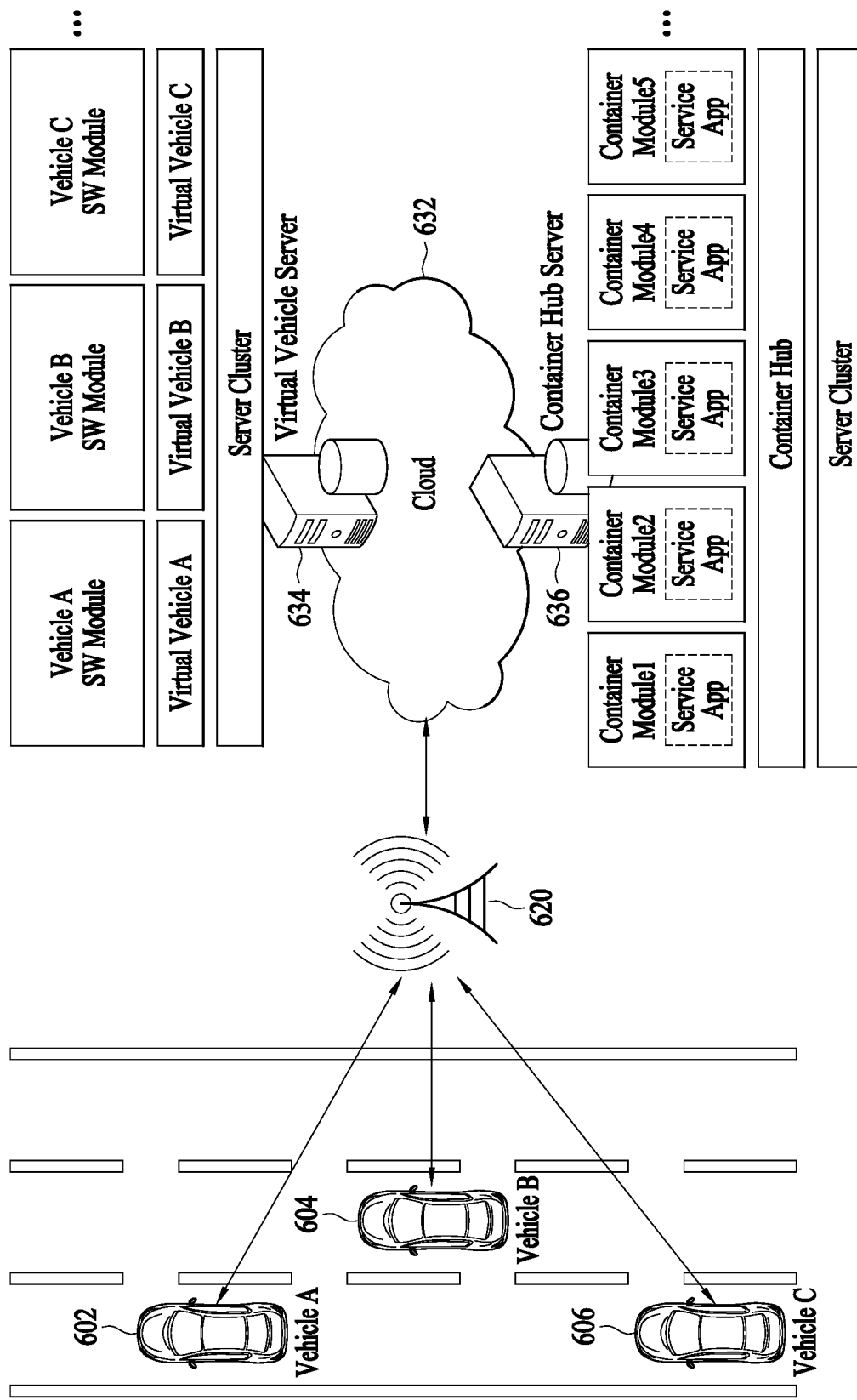
FIG. 6 is a diagram for explaining how a virtual machine (VM) is configured through communication between a vehicle and a server according to an embodiment of the present disclosure.

FIG. 6 is a diagram for explaining configuration of a virtual machine (VM) based on communication between a vehicle and a server according to an embodiment of the present disclosure.

Referring to FIG. 6, vehicles 602, 604, and 606 may communicate with a server 634 and 636 via a network 620, and the server 634 and 636 may be located on Cloud 302.

The vehicles 602, 604, and 606 may transmit information based on at least one of acquired information, information generated upon execution of an application, or a user's request, receive information from the server 634 and 636, and control operations of the vehicles 602, 604, and 606.

The network 620 may be a wireless communication network and may include a 5G network.

The server 634 and 636 may include a virtual vehicle server 634 for managing a virtual machine (VM) corresponding to each vehicle, and a container hub server 636 for managing a container corresponding to each application. Such servers are described as being configured separately and individually, but aspects of the present disclosure are not limited thereto and VMs and containers may be managed by the same server The virtual vehicle server 634 may generate a VM corresponding to at least one of hardware resources and software resources of each of the vehicles 602, 604, and 606, and may drive a VM corresponding to each of the vehicles 602, 604, and 606 based on information received from each of the vehicles 602, 604, and 606.

The container hub server 636 may manage a container corresponding to each application. The container may manage virtual hardware and software setting of a corresponding application, the corresponding application may be executed in the container, and the application corresponding to the container may be executed in a different device by moving or replicating the container. As such, by modularizing an application through a container, execution and movement of the corresponding application may be performed smoothly.

As such, VMs corresponding to resources of each of the vehicles 602, 604, and 606 may be generated in the virtual vehicle server 634 upon driving of the vehicles 602, 604, and 606 and receive information acquired by each of the vehicles 602, 604, and 606 from each of the vehicles 602, 604, and 606, and accordingly, computation corresponding to computation to be performed in the vehicles 602, 604, and 606 may be performed in the VMs. As such, as a VM corresponding to a vehicle is generated and an operation corresponding to the vehicle is performed in the VM based on information acquired from the vehicle, computation to be performed in the vehicle may be verified, an error may be identified in advance, or the computation may be supported.

Figure 7:
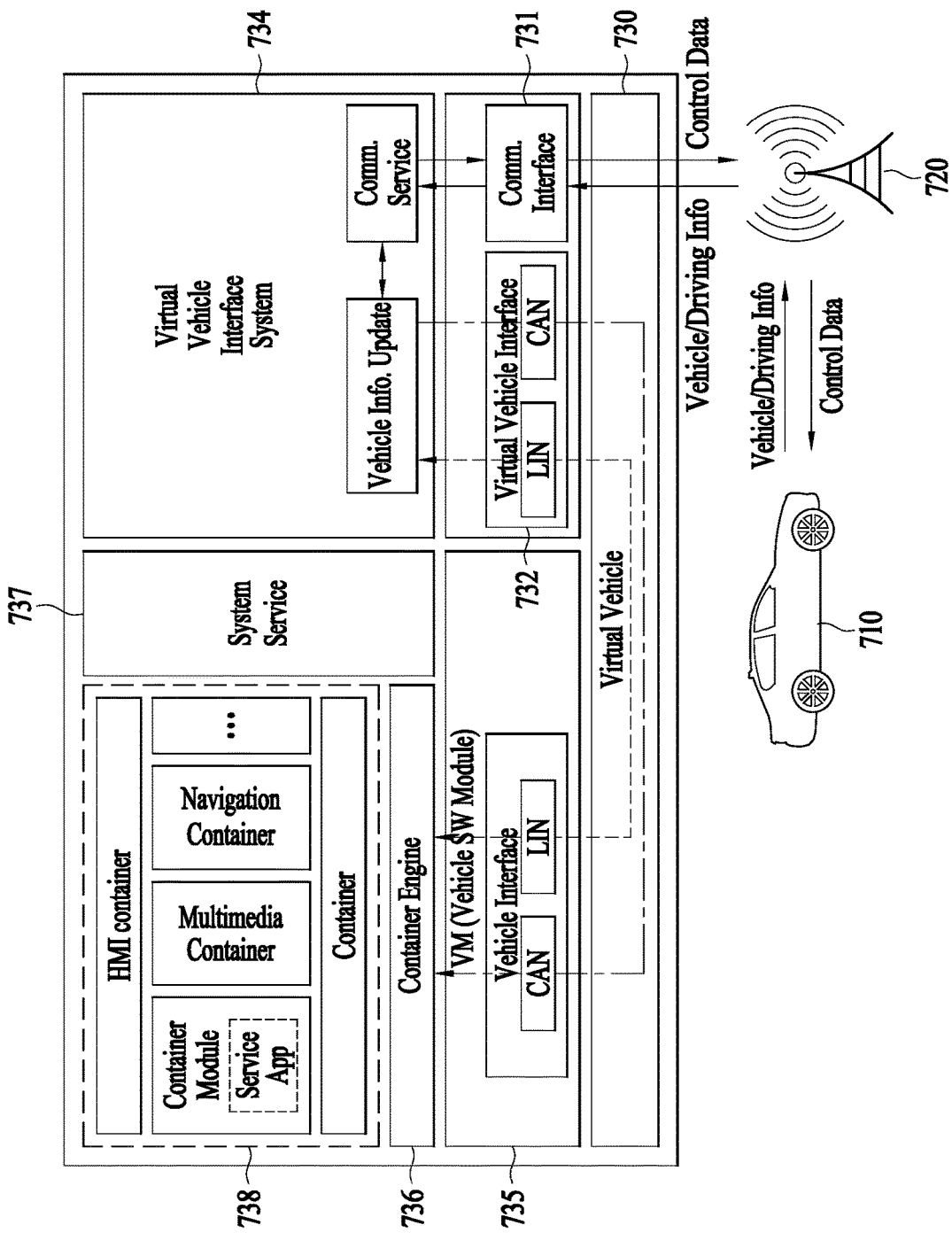
FIG. 7 is a diagram for explaining an operation of a server through communication with a vehicle according to an embodiment of the present disclosure.

FIG. 7 is a diagram for explaining an operation of a server in accordance with communication with a vehicle according to an embodiment of the present disclosure.

Referring to FIG. 7, a vehicle 710 may communicate with a virtual vehicle 730 generated in a virtual vehicle server via a network 720. For example, the vehicle 710 may transmit at least one of vehicle information or driving information to the virtual vehicle 730, and the virtual vehicle 730 may transmit information, whereby the vehicle 710 can be controlled based on a result of computation.

Information acquired by a sensor provided in the vehicle 710 may be transmitted to both the operating apparatus of the vehicle and the virtual vehicle 730, and sensor information to be transmitted to the virtual vehicle 730 via the network 720 may be transmitted through a dedicated interface.

The virtual vehicle 730 may include a virtual vehicle interface system 734 and a VM 735. The VM 735 corresponding to the vehicle 710 may be generated in the virtual vehicle 730, and a container engine 736 and a system service 737 may be provided on the VM 735. The container engine 736 and the system service 737 may be implemented logically on the VM 736, and the container engine 736 and the system service 737 may configure a system corresponding to the vehicle 710 by use of resources in the server.

A container 738 may include at least one container module, and an application corresponding to a corresponding container module may be executed on the container 738. A multimedia container module, a navigation container module, and a human-machine interface (HMI) container module are disclosed as examples of the container module, and an application which can be downloaded from an additional server may be included in the container module as well and may be executed on the container 738.

The VM 735 may include a vehicle interface for communication with a virtual vehicle interface system 734, and the vehicle interface may include a controller area network (CAN) and a local interconnect network (LIN).

The virtual vehicle interface system 734 may perform communication with an external vehicle and update vehicle-related information based on information that is acquired through a result of the communication. In order to communicate with the vehicle 710, the vehicle interface system 734 may perform communication with the vehicle 710 using a communication interface 731.

In addition, the virtual vehicle interface system 734 may include a virtual vehicle interface 732 in order to communicate with the VM 735, and the virtual vehicle interface 732 may include a CAN and a LIN.

In addition, a vehicle-related application on the VM 735 may be executed based on information received through the network 720, and a hardware interface realized on the VM 735 may receive information via a virtual interface. Hardware realized in the VM 735 may have resources corresponding to the vehicle 710 and allocate resources required to execute software.

Using the aforementioned elements, a VM corresponding to a vehicle may be driven in a server, and the VM may execute at least one application based on information acquired from the vehicle and transmit information on the execution of the at least one application to the vehicle. In addition, the VM may test information related to driving of the vehicle in advance and provide relevant information to the vehicle, thereby enabled to support an operation of the vehicle.

Figure 8:
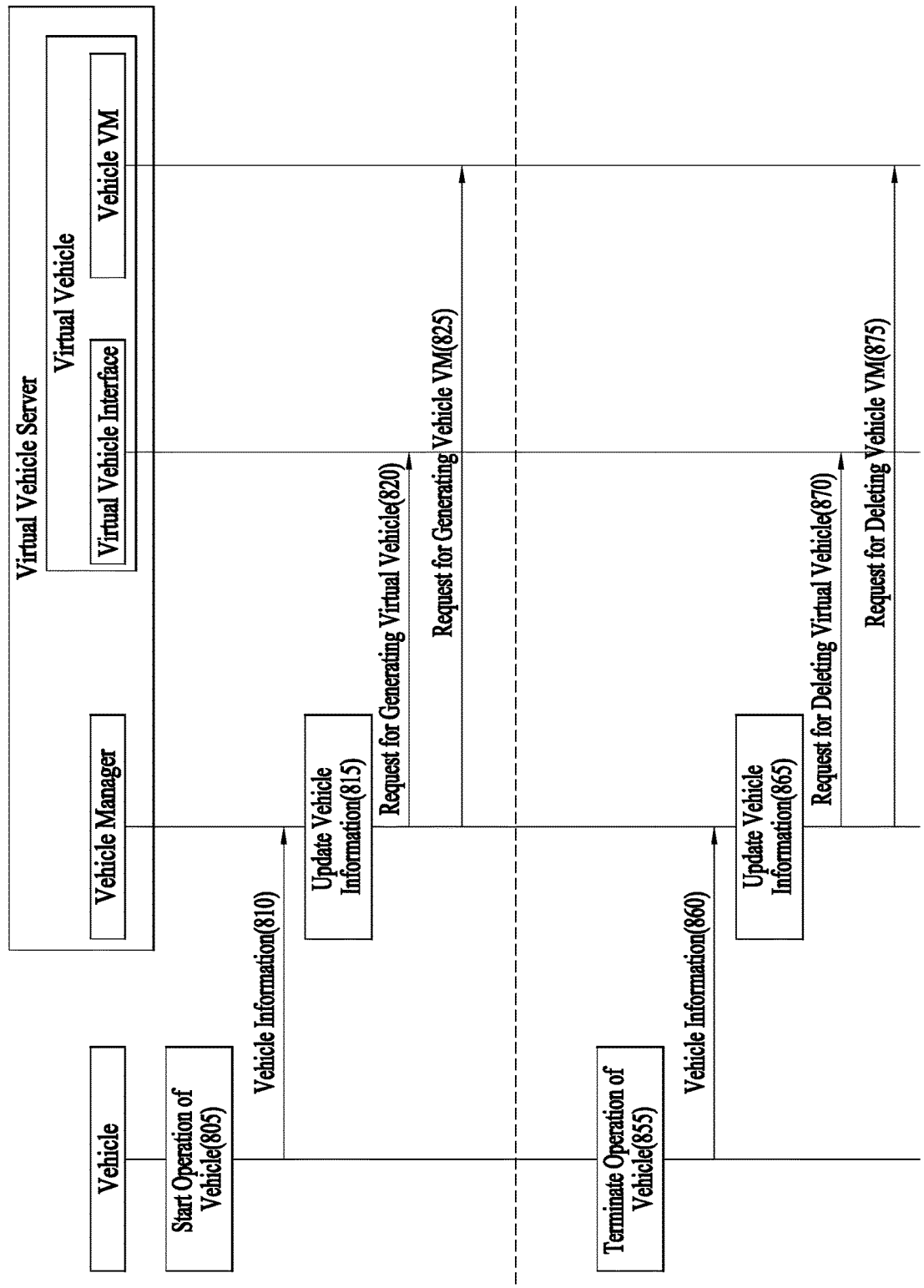
FIG. 8 is a diagram for explaining generation and deletion of a VM according to an embodiment of the present disclosure.

FIG. 8 is a diagram for explaining generation and deletion of a VM according to an embodiment of the present disclosure.

Referring to FIG. 8, a method for generating and deleting a vehicle VM in a virtual vehicle server in accordance with an operation of a vehicle. The virtual vehicle server may include a vehicle manager that executes an instruction to generate or delete a virtual vehicle VM. A virtual vehicle may be generated in the virtual vehicle server, and the vehicle VM may be generated on the virtual vehicle.

In step 805, a vehicle operation may start. The start of the vehicle operation may include receiving a user input requesting to start driving of a vehicle. For example, the start of the vehicle operation may include starting an ignition system of the vehicle and getting on the vehicle by opening a door of the vehicle. In addition, a vehicle user's transmitting an operation start instruction to the vehicle through a terminal capable of performing communication may be included in an event where the vehicle operation starts.

In step 810, the vehicle may transmit vehicle information to a vehicle manager. The vehicle information may include at least one of virtual vehicle generating request information, identification information of the vehicle, hardware information of the vehicle, information on software installed at the vehicle, or information on a vehicle-related application used by a user. The virtual vehicle generating request information may be information for requesting generation of a virtual vehicle and may include information that differs depending on a purpose of use of the virtual vehicle. According to an embodiment, a request for generating a virtual vehicle having the same resources as those of the vehicle may be transmitted, and a request for generating a virtual vehicle corresponding to the vehicle but having resources better than the resource of the vehicle may be transmitted.

In step 815, the vehicle manager may update vehicle information based on at least a part of received vehicle information. As for a vehicle which makes the first access, a database corresponding to the vehicle may be generated.

In step 820, the vehicle manager may transmit a message for requesting generation of a virtual vehicle to the virtual vehicle interface. The vehicle manager may transmit a request for generating a virtual vehicle based on at least one of information received in the previous steps. In doing so, the virtual vehicle interface may perform an operation for communication with a vehicle VM to be generated.

In step 825, a request for generating a vehicle VM may be transmitted to the vehicle VM. For example, a vehicle VM may be generated based on information that is received by the virtual vehicle interface in the previous step, and detailed generation request information related to thereto may be transmitted to the vehicle VM. The request for generating a vehicle VM may be received by the vehicle VM through the virtual vehicle interface. In this procedure, a vehicle VM having resources corresponding to the vehicle may be generated.

In the following embodiment, a process of transmitting a VM deleting request upon termination of a vehicle operation will be described.

In step 855, a vehicle operation may be terminated. Termination of the vehicle operation may include termination of driving of a vehicle and turning off an ignition system of the vehicle. In addition, the termination of the vehicle operation may include termination of driving of the vehicle in accordance with an input applied by a vehicle user.

In step 860, the vehicle may transmit vehicle information to the vehicle manager. Updated vehicle information including vehicle driving information may be transmitted to the vehicle manager upon driving of the vehicle. In addition, information for requesting deletion of the vehicle VM may be transmitted.

In step 865, the vehicle manager may update vehicle information based on received information. The vehicle information may be updated based on vehicle driving information, and the vehicle manager may manage such information corresponding to the vehicle.

In step 870, the vehicle manager may transmit a virtual vehicle deleting request to the virtual vehicle interface.

In step 875, the vehicle VM deleting request may be transmitted to the vehicle VM. The vehicle manager may transmit the vehicle VM deleting request directly to the vehicle VM, and the vehicle VM deleting request may be transmitted through the virtual vehicle interface.

The vehicle VM may be deleted in response to the received vehicle VM deleting request, and relevant resources may be released so that the virtual vehicle server can use the corresponding resources to generate a VM of a different vehicle.

According to an embodiment, even when driving of the vehicle is terminated, the vehicle VM may be maintained. In this case, some of functions related to the driving of the vehicle may be terminated other functions may be maintained to thereby provide information related to the vehicle. For example, a VM having an entertainment-related function irrelevant to driving of the vehicle may be maintained, and a user may be provided with a service by using the vehicle VM.

As such, a VM may be generated ad deleted in accordance with a vehicle operation, and, in doing so, the virtual vehicle server may be able to effectively manage resources of the server.

Figure 9:
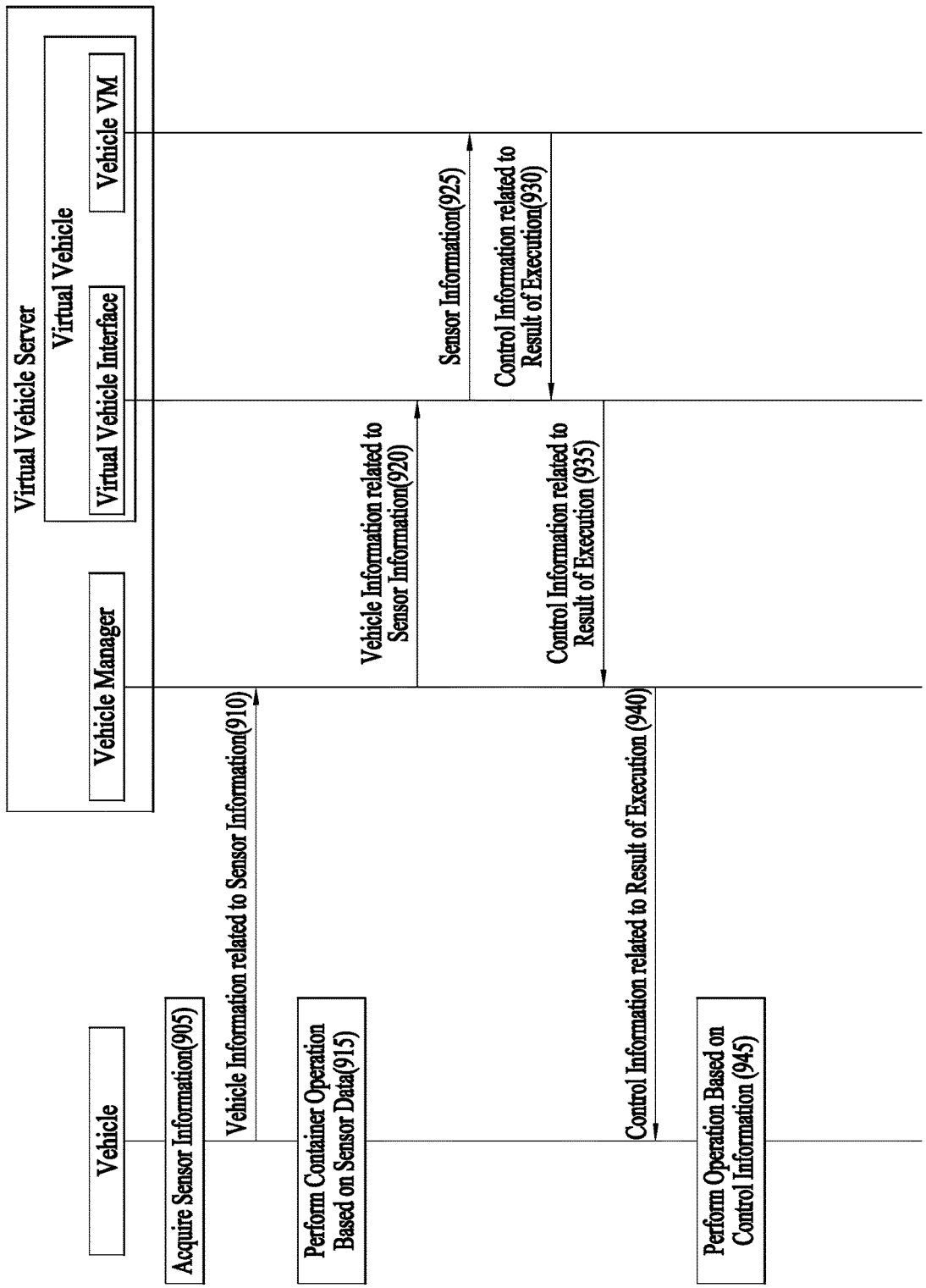
FIG. 9 is a diagram for explaining an operation of transmitting information acquired from a vehicle to a virtual vehicle server and controlling the vehicle by receiving information on execution in accordance therewith.

FIG. 9 is a diagram for explaining an operation of transmitting information acquired from a vehicle to a virtual vehicle server and controlling the vehicle by receiving information on execution in accordance therewith.

Referring to FIG. 9, there is illustrated a method for transmitting control information by a vehicle to a vehicle VM in a state where the vehicle VM corresponding to the vehicle is generated.

In step 905, the vehicle may acquire information (which is hereinafter referred to as sensor information) from a sensor in the vehicle. The sensor information may be image information related to the vehicle. For example, the sensor information may include image information received from one or more cameras included in the vehicle. In addition, the sensor information may include may include speed information of the vehicle and information on a distance to an object adjacent to the vehicle.

In step 910, the vehicle may transmit at least one the acquired sensor information, vehicle driving-related information, or information related to a resource usage of the vehicle. Identification information of the vehicle may be transmitted to a vehicle manager as well. Resource information may include an amount of resources to be used based on current driving information of the vehicle. In addition, the vehicle driving-related information may include information on a current driving location and a current driving speed of the vehicle, and may include route information that is guided to the vehicle.

In step 915, the vehicle may execute an application corresponding to a container installed in the vehicle, based on at least a part of the acquired sensor information. For example, the vehicle may execute an application related to driving of the vehicle, based on image information acquired from a sensor. In addition, the vehicle may execute an application installed in an operating apparatus related to the vehicle, based on an execution input that is applied by the user.

The vehicle manager may verify and store the received information, and may transmit at least a part of the information acquired in the step 920 to a virtual vehicle that is identified based on the vehicle identification information.

In step 925, a virtual vehicle interface may transmit received information to the vehicle VM. In doing so, information acquired and transmitted by the vehicle may be transmitted to the vehicle VM. A transmission channel for vehicle information related to the sensor information may be determined by a size of data. In addition, in case where data to be transmitted is about autonomous driving-related data, the corresponding data may be transmitted on a corresponding channel. More specifically, low-latency communication is required for autonomous driving-related data, and thus, the autonomous driving-related data may be transmitted on a low-latency communication channel.

In addition, information transmitted by the vehicle to the vehicle VM through the vehicle manager may include information on an application related to the transmitted information. Based on such information, an application to use sensor-related information transmitted by the vehicle VM may be determined, and the vehicle VM may perform computation based on the sensor-related information acquired from the vehicle and transmit a result of the computation to the vehicle.

The vehicle VM may transmit, to the virtual vehicle interface, control information obtained from computation that is performed based on the received information. The control information may be information including a result of image identification regarding autonomous driving, and the vehicle may control driving thereof based on the control information. In addition, the control information may include information on execution of a specific application.

In step 935, the virtual vehicle interface may transmit at least a part of the information received from the vehicle VM to the vehicle manager.

In step 940, the vehicle manager may transmit at least a part of the information received from the virtual vehicle interface.

In step 945, the vehicle may perform an operation based on the control information transmitted from the vehicle VM. The control information may include at least one of information on a control target, information on a control-related application, or information required to identify the sensor data which is the basis of the control information.

For example, when control information related to driving of the vehicle is received, the vehicle may perform driving based on the received information. In addition, when the received control information is information related to image identification, the vehicle may perform driving by taking into consideration information on an identified image.

As such, the vehicle VM may perform computation based on sensor information received from the vehicle and transmit information for controlling the vehicle to the vehicle. When the vehicle VM has sufficient resources compared to resources of the vehicle, the vehicle VM may support an operation of the vehicle through the aforementioned operation. For example, as computation is performed using a VM with respect to an operation which requires a great amount of calculation, resource management of the vehicle may be performed smoothly. In addition, when there is a shortage of resources, the VM may perform computation corresponding to some processes, so that a shortage of resources of the vehicle can be prevented.

In addition, when transmitting a message to the vehicle, the virtual vehicle server may determine a transmission channel through which the message is to be transmitted. For example, a transmission channel may be determined by a type of an application and may be determined by a type of a message to be transmitted. For example, a message required to be transmitted in real time may be transmitted through a channel suitable for high-speed transmission, and information not required to be transmitted in real time may be transmitted through a normal channel.

Figure 10:
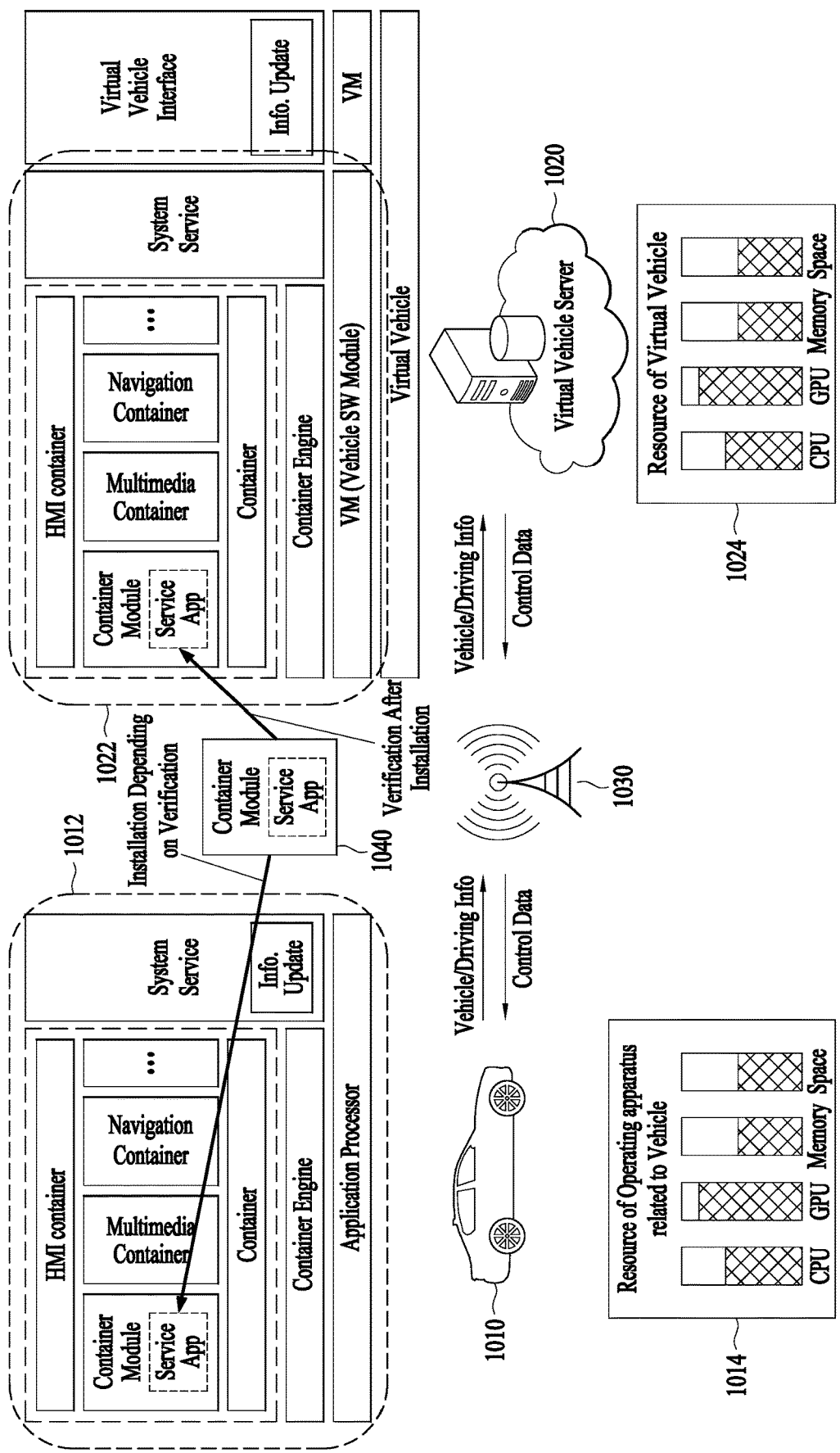
FIG. 10 is a diagram for explaining a method for verifying an application using a VM according to an embodiment of the present disclosure.

FIG. 10 is a diagram for explaining a method for verifying an application using a VM according to an embodiment of the present disclosure.

Referring to FIG. 10, a VM 1022 corresponding to a vehicle system 1012 of a vehicle 1010 may be generated in a virtual vehicle server 1020, and there is illustrated an embodiment where the VM 1022 verifies an application and installs the application in the vehicle system 1012.

The VM 1022 having resources corresponding to resources 1014 of the vehicle 1010 may be generated in the vehicle server 1020. The resources generated in the virtual vehicle server 1020 may correspond to hardware and software of the vehicle 1010, and, preferably, the VM 1022 under the same environment as that of the vehicle may be generated.

The VM 1022 generated on the virtual vehicle server 1020 may have resources that are variable according to a state of the vehicle 1010. For example, resources with low specification compared to the vehicle system 1012 may be allocated to the VM 1022 according to a test application, and, when the application is successfully executed on the VM 1022 to which the low specification resources are allocated, operation of the corresponding application in the vehicle system 1012 may be guaranteed. For example, when an application is related to driving of the vehicle, resources with low specifications may be allocated to the VM 1022.

An application installment process may be performed in response to a request from a user or a request from an operating apparatus of the vehicle 1010. The application may be included in a container module 1040. The container module 1040 may include a corresponding application, for example, a virtual memory for executing an application. As the application is included in the container module 1040, the application may be moved easily. User data related to the application may be also included in the container module 1040, and even when device change is made by moving the container module from one device to another device, it is possible to maintain the same application usage environment.

An application may be installed in the VM 1022 in response to an application installment request, and a test regarding execution of the application may be proceeded. The VM 1022 may include resources corresponding to the vehicle system 1012. For example, as the same resources as those of the vehicle is provided in the VM 1022, reliable execution of an application in the vehicle system 1012 may be guaranteed if the application is successfully executed in the VM 1022 without any error.

The vehicle 1010 may transmit, to the network 1030, information on an application needed to be installed in the vehicle 1010 and information for identifying the vehicle 1010. The network 1030 may transmit at least a part of information received from the virtual vehicle server based on the information for identifying the vehicle 1010. The virtual vehicle server 1020 may verify the VM 1022 corresponding to the vehicle 1010 based on the information required to identify the vehicle 1010. The virtual vehicle server 1020 may transmit at least a part of the received information to the verified VM 1022, and the VM 1022 may install an application based on the received information and execute a test to drive the installed application. Based on information on a driving text result, the VM 1022 may transmit application-related information to the vehicle 1010 via the network 1030. When no problem is found in the information on the driving test result, the vehicle 1010 may install the application based on a part of the received information. The vehicle 1010 may install the application by receiving the application from an additional server or by receiving a container corresponding to the application installed in the VM 1022. The received container may include information related to the test of the application, and the information related to the test of the application may include information related to an abnormal operation of the application. The vehicle system 1012 may execute the application by taking into consideration the information related to the abnormal operation of the application. According to an embodiment, it may be controlled such that computation regarding which an error has occurred is not performed in the vehicle 1010 or is performed in the VM 1022.

Figure 11:
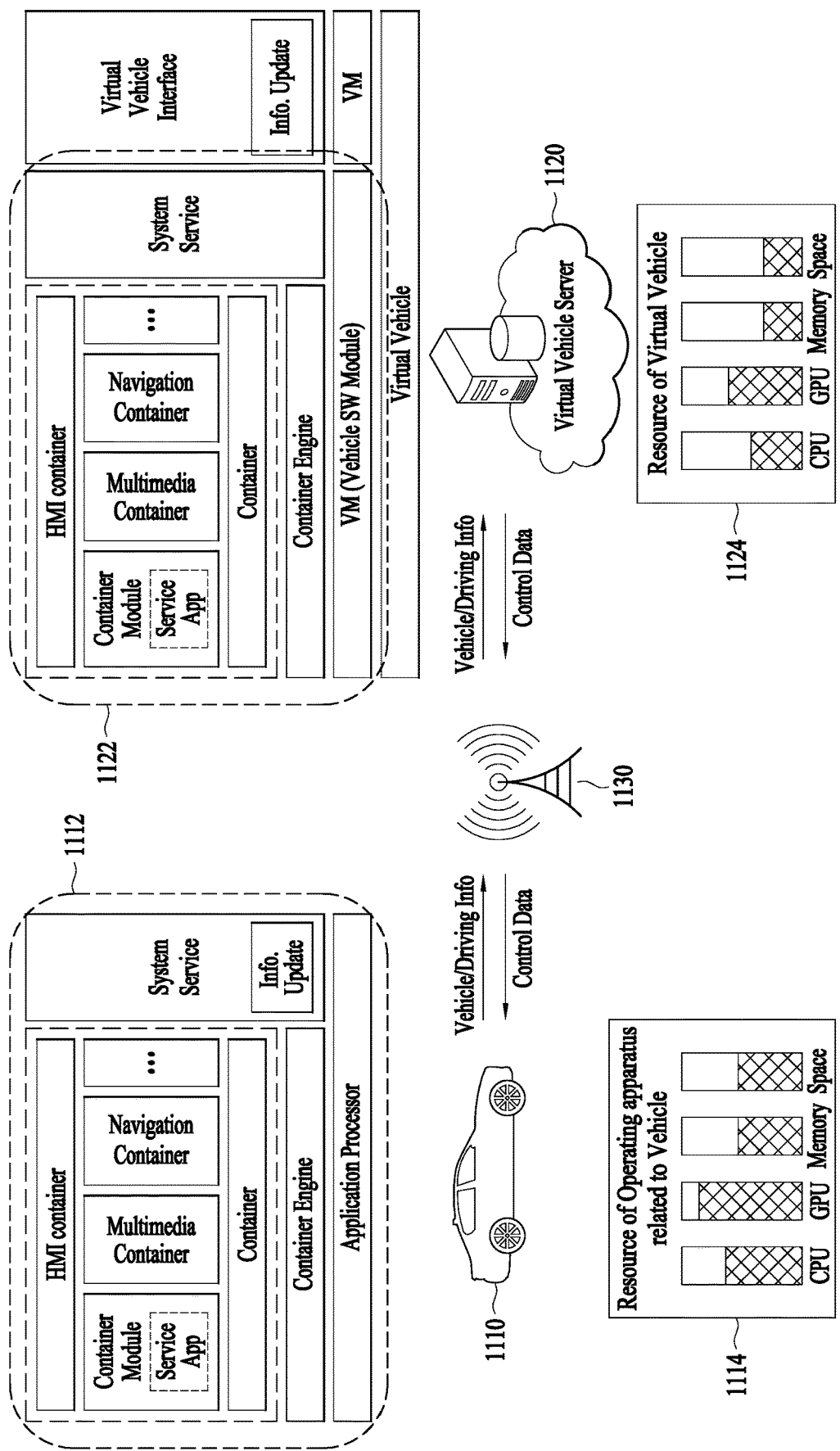
FIG. 11 is a diagram for explaining a method for supporting a vehicle using a VM according to an embodiment of the present disclosure.

FIG. 11 is a diagram for explaining a method for supporting a vehicle using a VM according to an embodiment of the present disclosure.

Referring to FIG. 11, a VM 1122 corresponding to a vehicle system 1112 of a vehicle 1110 may be generated in a virtual vehicle server 1120, and the VM 1122 may perform an operation for assisting computation of the vehicle system 1112.

The VM 1122 having resources corresponding to the resources 1114 of the vehicle 1110 may be generated in a virtual vehicle server 1120. The resources 1124 generated in the virtual vehicle server 1120 may correspond to hardware and software of the vehicle 1110, and, preferably, the VM 1122 having resources more excellent than the resources 1114 of the vehicle 1110 may be generated in the virtual vehicle server 1120. When such resources are allocated to the VM 1122, a utilization rate of the resources 1114 of the vehicle 1110 may be greater than a utilization rate of the VM resources 1124.

As such, as high specification resources are allocated to the VM 1124 compared to the vehicle system 1112, the VM 1124 may support an operation of the vehicle 1110. For example, based on information received from the vehicle 110 and related to at least one of driving or application execution, the VM 1124 may perform an operation corresponding to the vehicle system 1112. In addition, the VM 1124 may predict an operation of the vehicle system 1112, and, when an error occurs while the estimated operation is performed by the VM 1124, the VM 1124 may transmit control information to the vehicle 1110 so that the vehicle system 1112 does not perform such an operation.

In addition, when it is not possible to perform a driving-related operation or execute an application due to an error in the vehicle system 1112, an operation result of the VM 1122 may be transmitted to the vehicle 1110 so that the VM 1122 can support an operation of the vehicle. The vehicle system 1112 may transmit at least one of vehicle information or error-related information to the virtual vehicle server 1120. The virtual vehicle server 1120 may verify the corresponding VM 1122 based on at least one item of the received information, and transmit at least a part of the received information to the VM 1122. The VM 1122 may verify an error occurring in the vehicle system 1112, and verify information which can provide a support responsive to the error. The information which can provide support in response to the error may include information on a result of computation that corresponds to an operation of the vehicle 1110 based on information received from the vehicle 1110. The VM 1122 may transmit information related to the result of the computation to the vehicle 1110. When vehicle driving-related information is transmitted, the corresponding information may be transmitted on a channel that is allocated for low-latency and high-speed communication.

As such, as high specification resources are allocated to the VM 1122 compared to the vehicle system 1112, the VM 1122 may be enabled to support an operation of the vehicle 1110.

Figure 12:
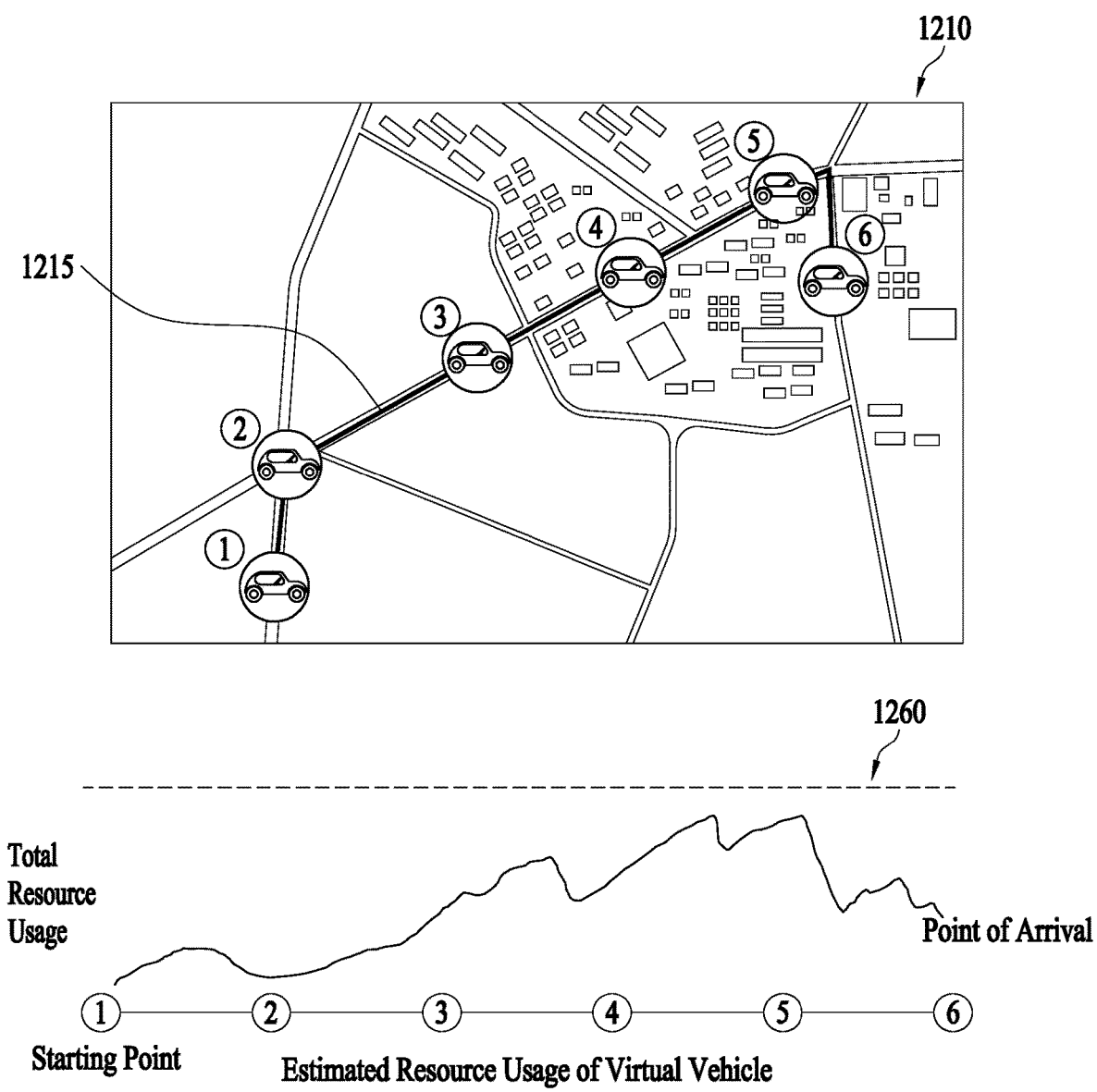
FIG. 12 is a diagram for explaining a resource usage depending on a driving route of a vehicle according to an embodiment of the present disclosure.

FIG. 12 is a diagram for explaining a resource usage depending on a driving route of a vehicle according to an embodiment of the present disclosure.

Referring to FIG. 12, there are illustrated a map 1210 including a route 1215 along which a vehicle is to drive, and a resource usage 1260 of a virtual vehicle on the route.

A VM having resources corresponding to the vehicle may be generated, and the VM may receive information on the route 1215 from the vehicle.

The VM may predict the resource usage 1260 that is required for a vehicle system when driving along the route 1215 based on the received information on the route 1215. The resource usage 1260 may include resources used for computation related to driving of the vehicle and may include resources used when an application is executed by a user of the vehicle through the vehicle system. The computation related to the driving of the vehicle may include image identification computation required for the driving of the vehicle.

In order to predict the resource usage 1260, information related to a vehicle which has recently driven along the route 1215 may be taken into consideration. For example, an amount of resources to be used for driving-related computation when driving along the route 1215 may be estimated based on information collected by the vehicle having driven along the route 1215 and information reported to a specific server by the vehicle having driven along the route 1215.

The vehicle may start from a point ①, pass through a path from ② to ⑤, and arrive at a point ⑥, and the resource usage 1260 at each point is illustrated. When the vehicle drives along a route from ④ to ⑥ in a city center area, the number of objects required to be detected through image identification may increase and accordingly the resource usage 1260 of the vehicle may increase. In addition, the resource usage 1260 may differ depending not just on complicity of the route 1215, but also on traffics and driving speed according thereto. In addition, the resource usage 1260 may differ depending on an application to be used along the route 1215.

Meanwhile, in case where the vehicle performs autonomous driving, it may be set such that use of some functions of the computation apparatus of the vehicle is limited or implemented through a VM even when the resource usage 1260 of the virtual vehicle is less than resource usage of the vehicle. In doing so, driving reliability of the vehicle may be ensured because autonomous driving requires a greater amount of computation of the vehicle than manual driving.

As such, a VM may predict a resource usage depending on a route in advance, and, when resources exceeding resources of the vehicle are required, it may be controlled such the VM controls driving of the vehicle or performs computation of the vehicle in a region where resources exceeding the resources of the vehicle is required. In doing so, it is possible to prevent a malfunction or error caused by a shortage of resources of the vehicle.

Figure 13:
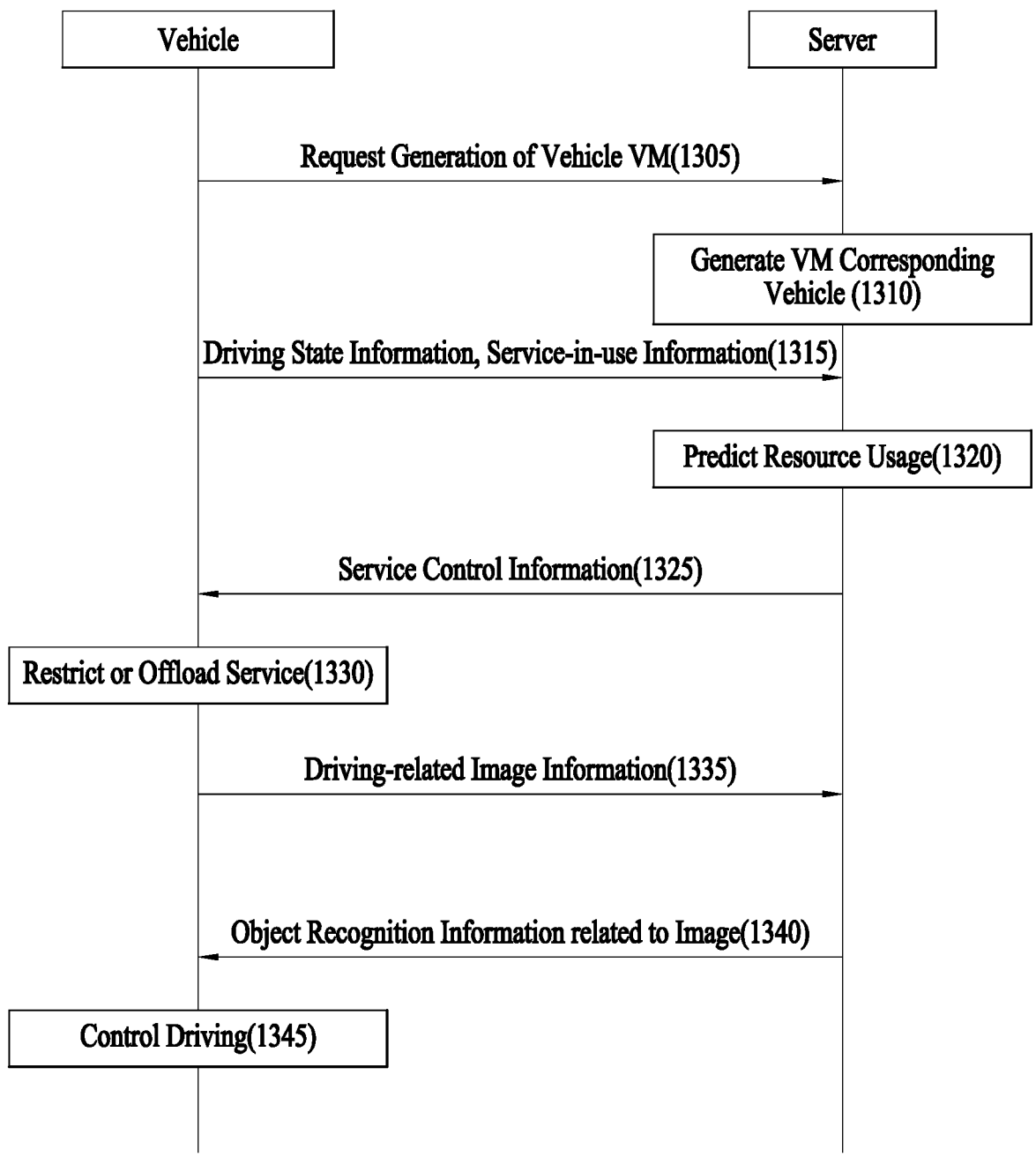
FIG. 13 is a diagram for explaining a method for supporting driving of a vehicle using a VM according to an embodiment of the present disclosure.

FIG. 13 is a diagram for explaining a method for supporting driving of a vehicle using a VM according to an embodiment of the present disclosure.

Referring to FIG. 13, a VM corresponding to a vehicle may be generated in a server through communication between the vehicle and the server, and service control information or object recognition information may be provided from the server.

In step 1305, the vehicle may transmit a request for generating a VM to the server. The request for generating a VM may include information for identifying the vehicle. In addition, the request for generating a VM may include information on a purpose of generating the VM, and resources of the VM may be determined based on the information on the purpose of generating the VM. For example, in case where a VM is generated in order to simulate resources of the vehicle, resources with specification identical to that of the resources of the vehicle may be allocated to a VM generated in the server, and, in case where the VM is generated to support the vehicle, resources with high specification compared to the vehicle may be allocated to the VM generated in the server.

In step 1310, the server may generate a VM corresponding to the vehicle based on at least a part of the received information. For example, resources of the VM may be determined based on the information on the purpose of generating the VM.

In step 1315, the vehicle may transmit at least one of driving state information or service-in-use information of the vehicle to the server. For example, at least one of a estimated driving route of the vehicle or sensor information collected by the vehicle may be transmitted to the server from the vehicle.

In step 1320, the server may predict resource usage based on at least a part of the received information. In addition, the server may predict resource usage based on information received from a different operating apparatus. For example, based on information acquired by a different vehicle having driven a route which is to be driven by the vehicle, the server may predict resource usage required for the vehicle to drive the corresponding route. Such information may be received from the different vehicle or an additional server.

In step 1325, the server may generate service control information in accordance with the resource usage estimated through the generated VM, and transmit the service information to the vehicle. For example, when computation requiring resources exceeding available resources of the vehicle is needed in a specific region, the server may transmit information on the specific region, information on the computation, and information on an amount of the exceeding resources to the vehicle. In addition, application information related to the computation may be transmitted.

In step 1330, based on at least a part of the received information, the vehicle may restrict a service provided by the operating apparatus of the vehicle or offload a service provided by the operating apparatus so that the service can be performed in the VM. For example, a service to be restricted and a service to be offloaded may be determined based on an amount of resources required for the corresponding service, a priority level of the corresponding service, information indicating whether it is necessary to respond in real time to the corresponding service, or information on a user of the corresponding service. For example, a service requiring a large amount of resources may be restricted or offloaded, and a service other than a service essential for driving of the vehicle may be restricted or offloaded. In addition, a service used by a user other than a driver may be restricted or offloaded. Such a service restricting and offloading method may be determined in any of various manners according to an embodiment.

In step 1335, the vehicle may transmit image information collected while driving. Service-related information provided by the vehicle, as well as the image information, may be transmitted to the server. The image information may be information corresponding to the service that is determined to be offloaded in the step 1330.

In step 1340, the server may provide the vehicle with recognition information on an object identified by the VM based on the received image information.

In step 1345, the vehicle may perform control of a driving operation based on at least a part of the received information. Such image identification information may be used to provide information to the user during an autonomous driving or manual driving operation, and the VM may be enabled to support an operation of the vehicle through the above-described embodiment.

In addition, when latency of a specific service due to a shortage of resources in the vehicle is expected, the vehicle may transmit information on the corresponding service to the server, and the VM may perform the corresponding service based on the transmitted information and provide a feedback to the vehicle.

In addition, based on information on resources currently in use, the vehicle may provide a user with information indicating that there is possibly a shortage of resources if an additional service is requested and used. In addition, the vehicle may determine to perform the service, requested by the user, through an additional server, provide information on such a determination to the user, and perform communication with the additional server so as to perform the service.

Meanwhile, the VM may be generated in the step 1310, and information related to computation performed by the operating apparatus of the vehicle may be transmitted from the vehicle to the server. For example, information acquired by the vehicle may be transmitted to the server, and the VM may perform, based on the transmitted information, computation corresponding to computation which is to be performed in the vehicle. Such an operation may be performed even when the vehicle has not received control information which, for example, relates to restricting or offloading a service. When an abnormal operation in the operating apparatus is detected, the operating apparatus of the vehicle may transmit information on the abnormal operation to the server. More specifically, when a shortage of resources is detected or a computational error is detected in the vehicle, the operating apparatus of the vehicle may transmit relevant information to the server. The relevant information may include information on input data required to perform computation, information on insufficient resources, information on computation of which the error is detected, or information on a cause of the abnormality. The VM generated in the server and corresponding to the vehicle may detect, based on received information, a shortage of resources or occurrence of an error in the operating apparatus of the vehicle, perform computation based on at least a part of the received information, and may transmit a result of the computation to the vehicle. As such, in case where the operating apparatus of the vehicle operates abnormally while the VM performs the same computation of the vehicle, the VM may receive information related to the abnormal operation, perform computation corresponding to the operating apparatus of the vehicle based on the received information, and transmit a result of the computation to the vehicle.

When the abnormal operation is resolved, the operating apparatus of the vehicle may transmit information relevant thereto to the server. The VM generated in the server and corresponding to the vehicle may stop transmission of a message to the vehicle based on the received information. In addition, the VM may monitor an operation of the operating apparatus of the vehicle based on the received information, and, when the abnormal operation in the operating apparatus of the vehicle is detected later on, the VM may perform an operation to support the operating apparatus of the vehicle.

In doing so, even when the vehicle is not allowed to perform computation normally, the VM may support the computation, and therefore, reliability of the operation of the vehicle may be ensured.

Figure 14:
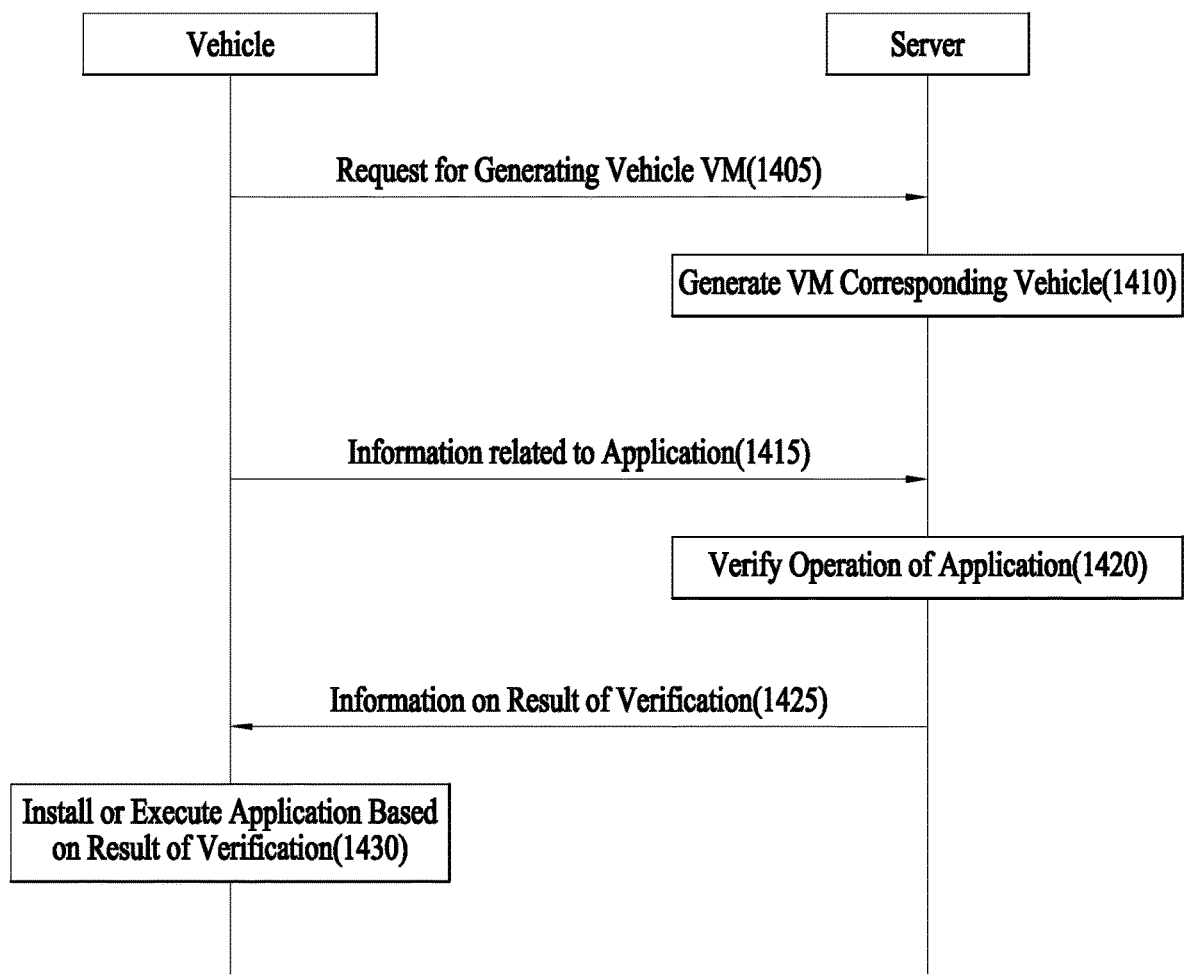
FIG. 14 is a diagram for explaining verification of an application using a VM according to an embodiment of the present disclosure.

FIG. 14 is a diagram for explaining verification of an application using a VM according to an embodiment of the present disclosure.

Referring to FIG. 14, there is illustrated a method for generating a VM corresponding to a vehicle, verifying an operation of a vehicle-related application in the generated VM, and providing relevant information to the vehicle.

In step 1405, the vehicle may transmit a message to a server to request generation of a VM. The message may include vehicle-related information and information on a purpose of generating the VM. The information on the purpose of generating the VM may include information on an application to be verified.

In step 1410, the server may generate a VM corresponding to the vehicle based on at least a part of received information. The server may determine resources of a VM to be generated based on the received information. For example, in order to verify an application installed in the vehicle, a VM having the same resources of the vehicle may be generated. In addition, in the need of generating a VM in order to verify a driving-related application, a VM with low specification resources compared to resources of the vehicle may be generated.

In step 1415, the vehicle may transmit the information on the application to be verified to the server. The information on the application to be verified may include at least one of information required to execute the application or information related to resources that are allocated by the vehicle for the application.

In 1420, the server may verify an operation of the application based on at least a part of received information.

The server may verify the application based on the generated VM, generate a container module corresponding to the application, and verify execution of the application. For example, resource overload may occur upon execution of the application or the application may be executed normally. In addition, even when resource overload does not occur upon execution of the application, there may be some cases where a problem occurs in the execution of the application during a verification process for a reason irrelevant to resources.

In step 1425, the server may transmit information on a verification result to the vehicle. The verification result information may include at least one of a result of the verification performed in the step 1420 or information indicating an operation of the vehicle responsive to the result of the verification, the operation which corresponds to the result of the verification. The information indicating the operation of the vehicle may include at least one of the following: information for restricting installation of the corresponding application, information on a function which possibly causes a problem upon execution of the application, or information necessary to receive a support from the VM with respect to the application's function for which there is a shortage of resources.

In step 1430, the vehicle may install and execute the application based on at least a part of the received information.

As such, as an application is verified and in a VM corresponding to the vehicle and the verified application is installed and executed, reliable operation of the application may be ensured and the application may be executed in consideration of a lacking resource of the vehicle.

According to an embodiment, an application requiring high specification resources compared to resources of the vehicle may not be installed or such an application may be executed on the basis of a support from the VM. In addition, when an abnormal operation in an application is detected during a verification process in the VM, the application may not be installed or a function corresponding to the application may not be performed, and therefore, reliable operation of the application may be ensured.

Figure 15:
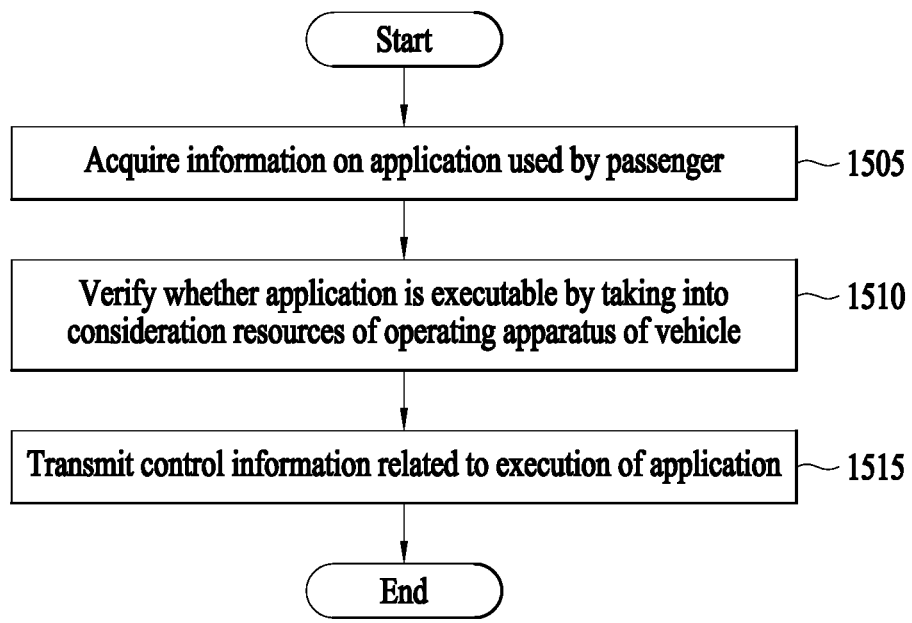
FIG. 15 is a diagram for explaining a method for controlling execution of an application by taking into consideration resources of a vehicle according to an embodiment of the present disclosure.

FIG. 15 is a diagram for explaining a method for controlling execution of an application by taking into consideration resources of a vehicle according to an embodiment of the present disclosure.

Referring to FIG. 15, there is illustrated a method for controlling execution of an application in a vehicle or a server where a VM corresponding to the vehicle is generated, by taking into consideration information on an application used by a passenger of the vehicle and resources of the vehicle. The passenger of the vehicle may execute the application by using resources of the vehicle. The application may be executed through communication between a terminal of the passenger and an operating apparatus of the vehicle and may be executed using an input/output device of the vehicle by the passenger. Such a procedure may be performed when the server acquires relevant application information before the passenger boards the vehicle.

In step 1505, the operating apparatus may acquire information on an application used by the passenger. The operating apparatus may be an operating apparatus related to the vehicle, an operating apparatus related to the server where the VM is installed, or an operating apparatus of an additional server to be enabled to monitor use of the application by the passenger. The information on the application used by the passenger may be acquired based on information that is input through the terminal of the user or through the input/output device of the vehicle.

In step 1510, the operating apparatus may verify whether the application used by the application is executable based on resources of the vehicle. Such an operation for identification be performed by the operating apparatus of the vehicle or an operating apparatus of the server where the VM is installed. Each operating apparatus may acquire information on an application used by a passenger, and monitor resources being used by the application upon execution of the corresponding application. Through this monitoring process, each operating apparatus may determine an available application. For example, when resources exceeding resources of the vehicle are required, execution of some applications may be restricted. Whether to restrict an application may be determined based on at least one of resources to be used by the corresponding application or a type of the corresponding application. For example, execution of a driving-related application, may not be restricted, but execution of an application other than the driving-related application may be restricted.

In step 1515, the operating apparatus may provide control information related to execution of the application to the vehicle based on at least one of information acquired or determined in the previous steps. Based on the control information, the vehicle may control an application to be executed.

As such, as a resource usage of the vehicle is monitored based on information on an application to be used by a passenger of the vehicle, it is possible to prevent execution of an application which requires resources exceeding resources of the vehicle. In addition, as an application to be executed is controlled adaptively, reliable operation of the application may be enabled.

Figure 16:
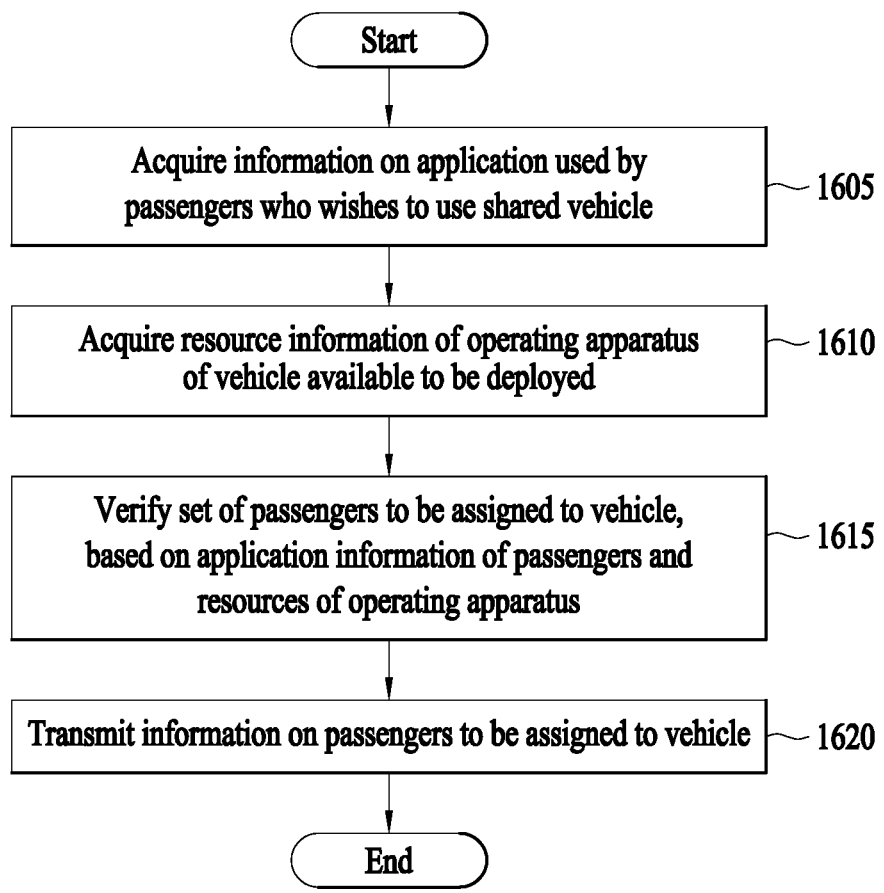
FIG. 16 is a diagram for explaining a method for assigning a passenger to a shared vehicle by taking into consideration resources of the vehicle according to an embodiment of the present disclosure.

FIG. 16 is a diagram for explaining a method for assigning a passenger to a shared vehicle by taking into consideration resources of the vehicle according to an embodiment of the present disclosure.

Referring to FIG. 16, there is illustrated a method for assigning a passenger to a vehicle, based on resources of the vehicle and information on an application used by the passenger, in an operating apparatus of a server that assigns a user to each shared vehicle. A method for assigning a shared vehicle is described, but this method may be generally applied in a situation where a passenger is assigned to a vehicle based on information on an application used by the passenger and information on available resources of the vehicle.

In step 1605, the operating apparatus may acquire information on an application used by at least one passenger who wishes to use a shared vehicle. The application used by a passenger may be selected by the passenger or may be determined by the operating apparatus based on information on an application currently in use by the passenger in his/her terminal. In addition, the operating apparatus may acquire identification information and location information of a user.

In step 1610, the operating apparatus may acquire information on available resources of the vehicle. For example, information on resources of the operating apparatus corresponding to a shared vehicle available to be deployed may be acquired. In addition, identification information and location information of a shared vehicle available to be deployed may be acquired as well.

In step 1615, the operating apparatus may determine a passenger assigned to each vehicle based on at least a part of the acquired information. For example, when users assigned to a specific vehicle execute an application in the specific vehicle, the operating apparatus may verify whether the application is executable in resources of the specific vehicle. Such verification may be performed using a VM corresponding to the specific vehicle. In addition, the operating apparatus may determine a passenger to be assigned to a vehicle, based on at least one of a location of the vehicle, a location of the passenger, resource information of the vehicle, and information on an application that the passenger wishes to use. In addition, when the application that the passenger wishes to use is not executable, the operating apparatus may also verify information related to thereto, which is to be provided to the passenger.

In step 1620, the operating apparatus may transmit information on a passenger to be assigned to the vehicle to at least one of the vehicle or the passenger, based on the information verified in the previous step. The operating apparatus may transmit information on a location of each passenger assigned to the vehicle, and may transmit vehicle information to the passenger. In addition, the operating apparatus may also transmit information on a not-executable application to the passenger, and, in this case, the operating apparatus may inquire as to whether the passenger wishes to be assigned to a different vehicle, and the operating apparatus may receive a response to the inquiry from the passenger.

As such, as a passenger to be assigned to a shared vehicle is determined by acquiring information on an application to be used by the passenger and by verifying a resource usage through a VM of a vehicle available to be deployed, the passenger may be able to receive a service in the vehicle smoothly.

Figure 17:
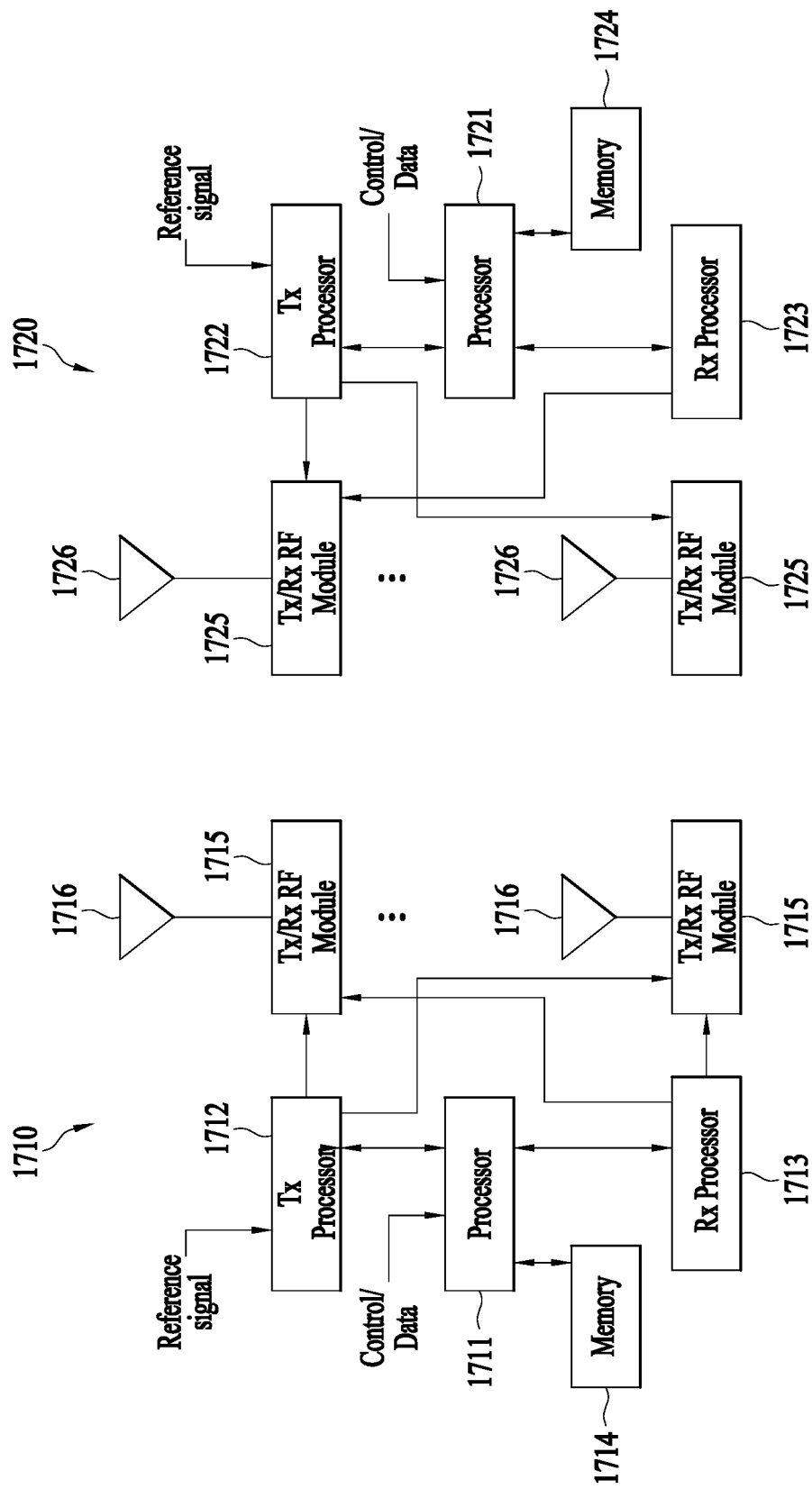
FIG. 17 is a block diagram of a wireless communication system to which a method according to an embodiment of the present disclosure can be applied.

FIG. 17 is a block diagram of a wireless communication system to which a method according to an embodiment of the present disclosure can be applied.

Referring to FIG. 17, an apparatus (an autonomous driving apparatus) including an autonomous driving module may be defined as a first communication device 1710, and a processor 1711 may perform detailed autonomous driving operations.

A 5G network including another vehicle capable of communicating with the autonomous driving apparatus may be defined as a second communication device 1720, and a processor 1721 may perform detailed autonomous driving operations.

The 5G network may be expressed as a first communication device, and the autonomous driving apparatus may be expressed as a second communication device.

For example, the first communication device or the second communication device may be a base station, a network node, a Tx terminal, an Rx terminal, a wireless device, a wireless communication device, an autonomous driving apparatus, etc.

For example, a terminal or User Equipment (UE) may include a vehicle, a mobile phone, a smart phone, a laptop computer, a personal digital assistant (PDA), a portable multimedia player (PMP), a navigation, a slate PC, a tablet PC, an ultrabook, a wearable device (e.g., a smartwatch, a smart glass, a head mounted display (HMD)), etc. The HMD may be a display device which can be worn on a user's head. For example, the HMD may be used to realize virtual reality (VR), augmented reality (AR), and mixed reality (MR). Referring to FIG. 1, the first communication device 1710 and the second communication device 1720 includes processors 1711 and 1721, memories 1714 and 1724, one or more Tx/Rx radio frequency (RF) modules 1715 and 1725, Tx processors 1712 and 1722, Rx processors 1713 and 1723, and antennas 1716 and 1726. A Tx/Rx module may be referred to as transceivers. Each Tx/RX module transmits a signal through the antenna 1726. The processor performs the above-described functions, processes, and/or methods. The processor 1721 may be related to the memory 1724 for storing program codes and data. The memory may be referred to as a computer readable medium. More specifically, in the DL (communication from the first communication device to the second communication), the Tx processor 1712 implements various signal processing functions of L1 layer (that is, physical layer). The Rx processor implements various signal processing functions of the L1 layer (that is, physical layer).

The UL (communication from the second communication device to the first communication device) is implemented in the first communication device 1710 in a manner similar to the above-description regarding receiver functions in the second communication device 1720. Each Tx/Rx module 1725 may receive a signal through the antenna 1726. Each Tx/Rx module provides a RF subcarrier and information to the Rx processor 1723. The processor 1721 may be related to the memory 1724 for storing program codes and data. The memory may be referred to as a computer readable medium.

Figure 18:
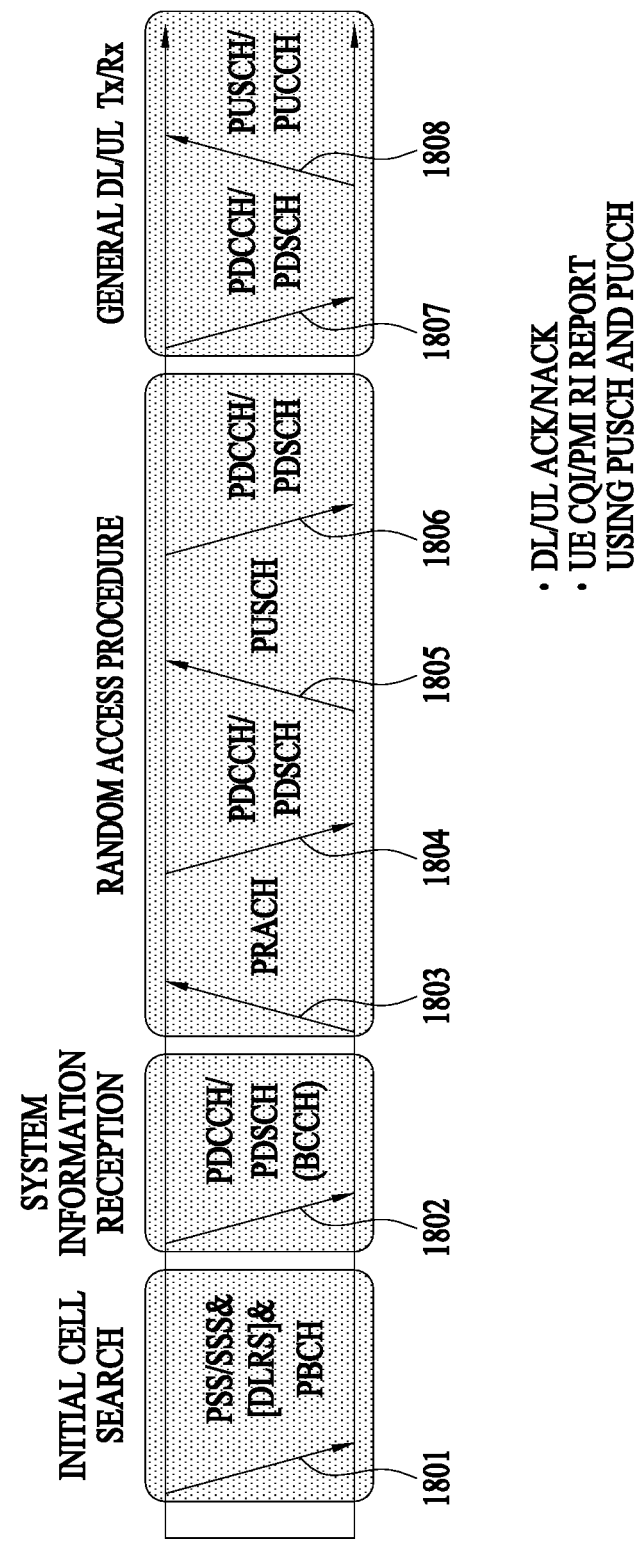
FIG. 18 is a block diagram of a wireless communication system to which a method according to an exemplary embodiment of the present disclosure can be applied.

FIG. 18 is a block diagram of a wireless communication system to which a method according to an exemplary embodiment of the present disclosure can be applied.

Referring to FIG. 18, when UE is powered on or enters a new cell, the UE may perform initial cell search such as synchronization with a BS (1801). To this end, the UE may receive a primary synchronization channel (P-SCH) and a secondary synchronization channel (S-SCH) from the BS to synchronize with the BS, and may acquire information such as a cell ID. In an LTE system and an NR system, the P-SCH and the S-SCH may be called a primary synchronization signal (PSS) and a secondary synchronization signal (SSS), respectively. After the initial cell search, the UE may acquire broadcast information in the cell by receiving a physical broadcast channel (PBCH) from the BS. Meanwhile, the UE may check the state of a downlink channel by receiving a downlink reference signal (DL RS) during the initial cell search. After completing the initial cell search, the UE may acquire more specific system information by receiving a physical downlink control channel (PDCCH) and a physical downlink shared channel (PDSCH) based on information on the PDCCH (1802).

When the UE initially accesses the BS or when there is no radio resource for signal transmission, the UE may perform a random access procedure (RACH) for the BS (1803 to 1806). To this end, the UE may transmit a specific sequence as a preamble through a physical random access channel (PRACH) (1803 and 1805), and may receive a random access response (RAR) message for the preamble through the PDCCH and the PDSCH (1804 and 1806). In the case of contention-based RACH, the UE may additionally perform a contention resolution procedure.

After performing the above-described procedure, the UE may perform, as general uplink/downlink signal transmission procedures, PDCCH/PDSCH reception (1807) and physical uplink shared channel (PUSCH)/physical uplink control channel (PUCCH) transmission (208). In particular, the UE may receive downlink control information (DCI) through the PDCCH. The UE may monitor a set of PDCCH candidates at monitoring occasions which are set in one or more control element sets (CORESETs) on a serving cell according to search space configurations. The set of PDCCH candidates to be monitored by the UE may be defined in terms of search space sets, and such a search space set may be a common search space set or a UE-specified search space set. The CORESET is composed of a set of (physical) resource blocks having a time duration of 1 to 3 OFDM symbols. The network may set the UE to have multiple CORESETs. The UE may monitor PDCCH candidates in one or more search space sets. Here, monitoring may refer to attempting to decode PDCCH candidate(s) in a search space. When the UE has succeeded in decoding one of the PDCCH candidates in the search space, the UE may determine that a PDCCH has been detected in a PDCCH candidate, and may perform PDSCH reception or PUSCH transmission based on DCI on the detected PDCCH. The PDCCH may be used to schedule DL transmissions through the PDSCH and UL transmissions through the PUSCH. Here, the DCI on the PDCCH may include downlink assignment (i.e., downlink (DL) grant) including at least modulation, coding format, and resource allotment information associated with a downlink shared channel or uplink (UL) grant including modulation, coding format, and resource allotment information associated with an uplink shared channel.

Referring to FIG. 18, initial access (IA) in the 5G communication system will be further described.

The UE may perform cell search, system information acquisition, beam alignment for initial access, and DL measurement based on an SSB. The SSB may be mixed with a synchronization signal/physical broadcast channel (SS/PBCH) block.

The SSB may be composed of a PSS, an SSS, and a PBCH. The SSB may be composed of four consecutive OFDM symbols, and the PSS, PBCH, SSS/PBCH, or PBCH may be transmitted for each OFDM symbol. Each of the PSS and SSS may be composed of 1 OFDM symbol and 127 subcarriers, and the PBCH may be composed of 3 OFDM symbols and 576 subcarriers.

The cell search may refer to a procedure in which the UE acquires time/frequency synchronization of a cell and detects a cell identifier (ID) (e.g., a physical layer cell ID (PCI)) of the cell. The PSS may be used to detect a cell ID in a cell ID group, and the SSS may be used to detect the cell ID group. The PBCH may be used for SSB (time) index detection and half-frame detection.

There may be 336 cell ID groups, and three cell IDs may exist for each cell ID group. Thus, a total of 1008 cell IDs may exist. Information on a cell ID group, to which a cell ID of a cell belongs, may be provided or acquired through the SSS of the cell, and information on a cell ID among cell IDs of 336 cell ID groups may be provided or acquired through the PSS.

The SSB may be transmitted periodically based on the periodicity of the SSB. An SSB basic period assumed by the UE at the time of initial cell search may be defined as 20 ms. After cell access, the periodicity of the SSB may be set to one of 5 ms, 10 ms, 20 ms, 40 ms, 80 ms, and 160 ms by a network (e.g., BS).

Next, acquisition of system information (SI) will be described.

The SI may include a master information block (MIB) and multiple system information blocks (SIBs). The SI other than the MIB may be referred to as remaining minimum system Information (RMSI). The MIB may include information/parameters for monitoring the PDCCH which schedules the PDSCH carrying system information block 1 (SIB1), and may be transmitted by the BS through the PBCH of the SSB. The SIB1 may include information on the availability and scheduling (e.g., a transmission period and an SI-window size) of the remaining SIBs (hereinafter, SIBx (x being an integer of 2 or more)). The SIBx may be included in an SI message and may be transmitted through the PDSCH. Each SI message may be transmitted within a time window (i.e., an SI-window) which periodically occurs.

Referring to FIG. 18, random access (RA) in the 5G communication system will be further described.

The random access may be used for various purposes. For example, the random access may be used for network initial access, handover, and UE-triggered UL data transmission. The UE may acquire UL synchronization and UL transmission resources through the random access. The random access may be classified into contention-based random access and contention-free random access. A detailed procedure for the contention-based random access is as follows.

The UE may transmit a random access preamble as an Msg1 of the random access in UL through the PRACH. Random access preamble sequences having two different lengths may be supported. A Long sequence length of 839 may be applied to a subcarrier spacing of 1.25 kHz or 5 kHz, and a short sequence length of 139 may be applied to a subcarrier spacing of 15 kHz, 30 kHz, 60 kHz, or 120 kHz.

When the BS receives the random access preamble from the UE, the BS may transmit a random access response (RAR) message (Msg2) to the UE. The PDCCH which schedules the PDSCH including the RAR may be transmitted by being CRC-masked with a random access (RA) radio network temporary identifier (RNTI) (RA-RNTI). The UE, which has detected the PDCCH masked with the RA-RNTI, may receive the RAR from the PDSCH scheduled by the DCI carried by the PDCCH. The UE may check whether random access response information for the preamble transmitted by the UE, i.e., Msg1, is in the RAR. Whether the random access response information for the Msg1 transmitted by the UE is in the RAR may be determined by whether there is a random access preamble ID for the preamble transmitted by the UE. When there is no response to the Msg1, the UE may retransmit the RACH preamble a predetermined number of times while performing power ramping. The UE may calculate PRACH transmission power for retransmission of the preamble based on the most recent path loss and a power ramping counter.

The UE may transmit, as an Msg3 of the random access, UL transmission through the uplink shared channel based on the random access response information. The Msg3 may include an RRC connection request and an UE identifier. As a response to the Msg3, the network may transmit an Msg4, which may be treated as a contention resolution message in DL. By receiving the Msg4, the UE may enter an RRC-connected state.

Figure 19:
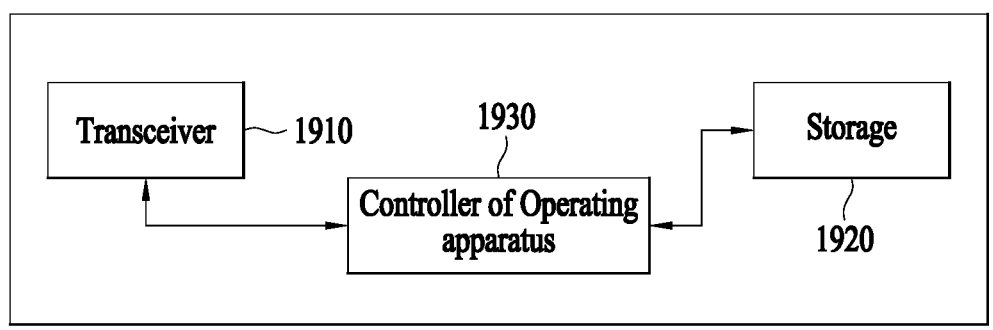
FIG. 19 is a block diagram for explaining an operating apparatus according to an embodiment of the present disclosure.

FIG. 19 is a block diagram for explaining an operating apparatus according to an embodiment of the present disclosure.

Referring to FIG. 19, the operating apparatus may include a transceiver 1910, a storage 1920, and a controller 1930. At least one of a personal device, a shared device, and an external node described in an embodiment may include the operating apparatus. The operating apparatus may be an operating apparatus of a vehicle or an operating apparatus of a server. The operating apparatus of the vehicle may control overall operations of the vehicle, and operations described as operation of the vehicle may be controlled by the operating apparatus. The operating apparatus of the server may control overall operations of the server, and operations described as operations of the server may be controlled by the computation device. However, the respective operating apparatus installed in the vehicle and the server are not necessarily identical to each other, and it is obvious that any type of operating apparatus can be used to control operations described.

The transceiver 1910 may communicate information with another node. The transceiver 1910 may perform at least one of wired communication or wireless communication and may transceiver information with another device, a server, and a network.

The storage 1920 may store information related to the operating apparatus. In addition, the storage may store at least a part of data communicated through the transceiver 1910. The storage 1920 may include a non-volatile memory. Meanwhile, an external server connected through the transceiver 1910 may be utilized as the storage 1920.

The controller 1930 may control an operation of the computation device according to an embodiment. The controller 1930 may include at least one processor and may control operations of the transceiver 1910 and the storage 1920 and the above-described operations of the device.

The terms or words described in the description and the claims should not be limited by a general or lexical meaning, instead should be analyzed as a meaning and a concept through which the inventor defines and describes the invention to the best of his/her ability, to comply with the idea of the invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

What is claimed is:

1. A method for operating a virtual vehicle at a cloud network, the method comprising:
   receiving a request for generating a virtual machine (VM) for a vehicle;
   receiving vehicle information from a client associated with the vehicle, the vehicle information including at least one of identification information of the vehicle, hardware information of the vehicle, software information of the vehicle, or application information regarding the vehicle;
   generating a VM having a resource corresponding to a resource of the vehicle based on the vehicle information;
   receiving vehicle update information from the client via one or more channels, the vehicle update information including a resource status of the vehicle;
   performing computation corresponding to the vehicle update information using the VM; and
   transmitting information related to a result of the computation to the client,
   wherein the computation is performed at the VM based on the resource status of the vehicle,
   wherein the resource status of the vehicle includes information related to a resource usage of the vehicle, and
   wherein the information related to the resource usage of the vehicle includes an amount of resources to be used on a route based on current driving information of the vehicle that has traveled along the route.

2. The method of claim 1, wherein the computation is performed to verify an operation of the vehicle.

3. The method of claim 1, wherein an operation of the vehicle is controlled based on the information related to the result of the computation in response to a detection of an abnormal operation at the vehicle, the abnormal operation being related to a shortage of resources in the vehicle.

4. The method of claim 1, wherein a computing process of the vehicle corresponding to the computation is omitted based on a usage of a computing resource of the computation.

5. The method of claim 1, wherein the VM is generated by a vehicle manager at the cloud network, and
   wherein the vehicle manager is configured to process at least one of the vehicle information, the vehicle update information, or the information related to the result of the computation.

6. The method of claim 1, wherein the VM is deleted by a vehicle manager at the cloud network.

7. The method of claim 1, further comprising:
   executing at least one application based on at least one of the vehicle information, or vehicle update information using the VM, and
   transmitting information on the executed at least one application to the client.

8. The method of claim 1, wherein the information related to the result of the computation is transmitted on a channel that is allocated for low-latency and high speed communication, based on whether the information related to the result of the computation includes driving related information of the vehicle.

9. The method of claim 1, wherein the resource of in the vehicle includes at least one of a central processing unit (CPU), a graphics processing unit (GPU), a memory, or a storage space.

10. A method for using a virtual vehicle at a vehicle, the method comprising:
    receiving a request for generating a virtual machine (VM) for a vehicle, the VM having a resource corresponding to a resource of the vehicle;
    transmitting vehicle information to a cloud network, the vehicle information including at least one of identification information of the vehicle, hardware information of the vehicle, software information of the vehicle, or application information regarding to the vehicle;
    transmitting vehicle update information to the cloud network, via one or more channels, the vehicle update information including a resource status of the vehicle; and
    receiving, from the cloud network, information related to a result of a computation corresponding to the vehicle update information performed by the VM,
    wherein the computation is performed at the VM based on the resource status of the vehicle,
    wherein the resource status of the vehicle includes information related to a resource usage of the vehicle, and
    wherein the information related to the resource usage of the vehicle includes an amount of resources to be used on a route based on current driving information of the vehicle that has traveled along the route.

11. The method of claim 10, wherein the computation is performed at the VM to verify an operation of the vehicle.

12. The method of claim 10, wherein an operation of the vehicle is controlled based on the information related to the result of the computation in response to a detection of an abnormal operation at the vehicle, the abnormal operation being related to a shortage of resources in the vehicle.

13. The method of claim 10, further comprising:
    omitting a computing process of the vehicle corresponding to the computation based on a usage of computing resource of the computation.

14. The method of claim 10, wherein the VM is generated by a vehicle manager at the cloud network, and
    wherein the vehicle manager is configured to process at least one of the vehicle information, the vehicle update information, or the information related to the result of the computation.

15. The method of claim 10, wherein the resource of resources in the vehicle includes at least one of a central processing unit (CPU), a graphics processing unit (GPU), a memory, or a storage space.

16. An operating apparatus at a vehicle, the operating apparatus comprising:
a transceiver configured to transmit and receive data;
a memory configured to store instructions, vehicle information, and vehicle update information;
a sensor configured to acquire the vehicle information and the vehicle update information, each of the vehicle information or the vehicle update information including at least one of internal information, surrounding environmental information, or user information of the vehicle; and
a controller configured to control the transceiver and execute the instructions to perform operations comprising:
transmitting, to a cloud network, the vehicle information including at least one of identification information of the vehicle, hardware information of the vehicle, software information of the vehicle, or application information regarding to the vehicle,
transmitting, to the cloud network and via one or more channels, the vehicle update information, the vehicle update information including a resource status of the vehicle, and
receiving, from the cloud network, information related to a result of a computation corresponding to the vehicle update information performed by a virtual machine (VM) having a resource corresponding to a resource of the vehicle,
wherein the computation is performed at the VM based on the resource status of the vehicle,
wherein the resource status of the vehicle includes information related to a resource usage of the vehicle, and
wherein the information related to the resource usage of the vehicle includes an amount of resources to be used on a route based on current driving information of the vehicle that has traveled along the route.

* * * * *